(12) United States Patent
Novak et al.

(10) Patent No.: US 11,341,337 B1
(45) Date of Patent: May 24, 2022

(54) SEMANTIC MESSAGING COLLABORATION SYSTEM

(71) Applicants: Ana Novak, Brighton (AU); Mathieu Julien Rainville Wells, Saint-Lazare (CA); Neil Teitelbaum, Ottawa (CA)

(72) Inventors: Ana Novak, Brighton (AU); Mathieu Julien Rainville Wells, Saint-Lazare (CA); Neil Teitelbaum, Ottawa (CA)

(73) Assignee: Winter Chat Pty Ltd, Brighton (AU)

( * ) Notice: Subject to any disclaimer, the term of this patent is extended or adjusted under 35 U.S.C. 154(b) by 0 days.

(21) Appl. No.: 17/345,041

(22) Filed: Jun. 11, 2021

(51) Int. Cl.
*G06F 40/35* (2020.01)
*G06F 16/33* (2019.01)
*G06N 20/00* (2019.01)
*G06F 40/279* (2020.01)

(52) U.S. Cl.
CPC .......... *G06F 40/35* (2020.01); *G06F 16/3344* (2019.01); *G06F 40/279* (2020.01); *G06N 20/00* (2019.01)

(58) Field of Classification Search
CPC .... G06F 16/3344; G06F 40/279; G06F 40/35; G06N 20/00
See application file for complete search history.

(56) References Cited

U.S. PATENT DOCUMENTS

| | | | | |
|---|---|---|---|---|
| 7,415,537 B1 * | 8/2008 | Maes | ................... | G06F 16/9577 709/246 |
| 8,271,486 B2 * | 9/2012 | Caputo | ............... | H04L 65/1069 707/732 |
| 10,255,352 B1 * | 4/2019 | Xu | .......... | G06Q 50/01 |
| 2006/0080321 A1 * | 4/2006 | Horn | ................... | G06F 16/9535 |
| 2006/0104515 A1 * | 5/2006 | King | ....................... | G06F 16/93 382/190 |
| 2006/0156228 A1 * | 7/2006 | Gallo | .................. | G06F 3/04842 715/202 |
| 2006/0238383 A1 * | 10/2006 | Kimchi | ............. | G01C 21/3667 340/995.1 |
| 2008/0270389 A1 * | 10/2008 | Jones | ..................... | H04L 67/30 |
| 2009/0164904 A1 * | 6/2009 | Horowitz | ................ | G06F 16/78 715/723 |
| 2010/0010987 A1 * | 1/2010 | Smyth | ................. | G06F 16/9535 707/E17.014 |

(Continued)

*Primary Examiner* — Eric Yen

(57) ABSTRACT

A semantic messaging collaboration (SMC) system using simultaneous post, user and user-post interaction tagging. The system includes a natural language processing (NLP) engine, statistics engine, tag management engine and a story engine. The NLP engine is configured to: a) identify topics that appear in a select conversation b) analyze user expertise from available sources, and c) analyze posts with respect to sentiment. The statistics engine is configured to generate descriptive statistics from available system information on user-post interactions, as well as select outputs from NLP engine. The tag management engine generates and collates system tags. The SMC tagging system along with advanced rule-based filtering capability, enables users to effectively organize conversations, find and extract precise uncluttered information, and in the story engine combine the information into a semantic output for human interpretation—such as summary documents, meeting notes, feedback reports, agendas, presentations or other.

17 Claims, 20 Drawing Sheets

(56) References Cited

U.S. PATENT DOCUMENTS

| | | | | |
|---|---|---|---|---|
| 2010/0030578 | A1* | 2/2010 | Siddique | G06Q 40/12 705/3 |
| 2010/0042619 | A1* | 2/2010 | Jones | G06F 16/24568 707/770 |
| 2012/0030152 | A1* | 2/2012 | Pueyo | G06F 16/3331 706/12 |
| 2012/0197898 | A1* | 8/2012 | Pandey | G06F 16/2264 707/741 |
| 2014/0297618 | A1* | 10/2014 | Sherman | G06F 16/9558 707/710 |
| 2014/0337257 | A1* | 11/2014 | Chatterjee | G06N 20/00 706/12 |
| 2018/0082183 | A1* | 3/2018 | Hertz | G06Q 10/10 |
| 2019/0327531 | A1* | 10/2019 | Hundemer | G11B 27/031 |
| 2019/0361937 | A1* | 11/2019 | Rogynskyy | G06F 7/14 |
| 2020/0287736 | A1* | 9/2020 | Zhuk | G06N 3/0454 |
| 2021/0011967 | A1* | 1/2021 | Rathod | G06F 16/9537 |
| 2021/0090449 | A1* | 3/2021 | Smith | G06N 3/02 |
| 2021/0248136 | A1* | 8/2021 | Panuganty | G06N 20/00 |

\* cited by examiner

SEMANTIC MESSAGING COLLABORATION SYSTEM

FIELD

The present disclosure relates generally to the field of groupware and messaging software, and more specifically to a method and system for messaging information management and summarization, using a combined user-post tag-based categorization system, rule-based filtering and natural language processing.

BACKGROUND

Messaging platforms have been employed and evolving for almost two decades. They allow users to submit and/or access various types of messages—commonly referred to as "posts". These posts contain content in the form of text, graphics, sound or video, which is logically organized into discussion topics or channels and discussion threads. A discussion thread is defined as a short conversation which starts with a single post, that is followed by one or more "reply" posts presented in reverse chronological order. The challenge with existing systems is that outside of discussion channels and threads, which encapsulate or bind similar messages, few other enablers for organizing voluminous conversations exist. This is particularly challenging in messaging platforms which cater to business communication, where it is essential to rapidly find high value information in a growing repository of spontaneous user posts. To alleviate some of these problems, some systems have introduced tags as a means for classifying messages, such as labeling interesting, irrelevant or funny posts. However, these labels tend to be pre-imposed and somewhat limited in nature. Much improvement is still required in information management, summarization of data, privacy considerations, enabling productive collaboration in online groups and more.

In recent years, Machine Learning algorithms are increasingly being utilized to enhance manual tagging of multimedia content. For example, customer support software platforms can automatically classify sales representative—customer conversations based on a number of pre-defined, frequently occurring topics. Twitter™ is also a very good resource for text data, further providing an Application Programming Interface (API) through which to acquire stored data for anyone interested in data mining. A number of articles describe various NLP techniques and their respective efficiencies in assigning topics to tweets. However, one vital aspect is missing. Consider a familiar example of reading emails; one does not just absorb the content without first parsing for "who it is from". The credibility of a source of information also plays a vital role in the assessment of information. For example, information regarding COVID published in a medical journal, written by a Professor in medicine, would likely be more trusted than the information on the same topic published by a generic magazine. This disclosure considers user's profile and input as an additional source of information for organizing and retrieving desired content.

BRIEF DESCRIPTION OF THE DRAWINGS

Exemplary embodiments will be described in accordance with the drawings in which.

SUMMARY

Figure 1:
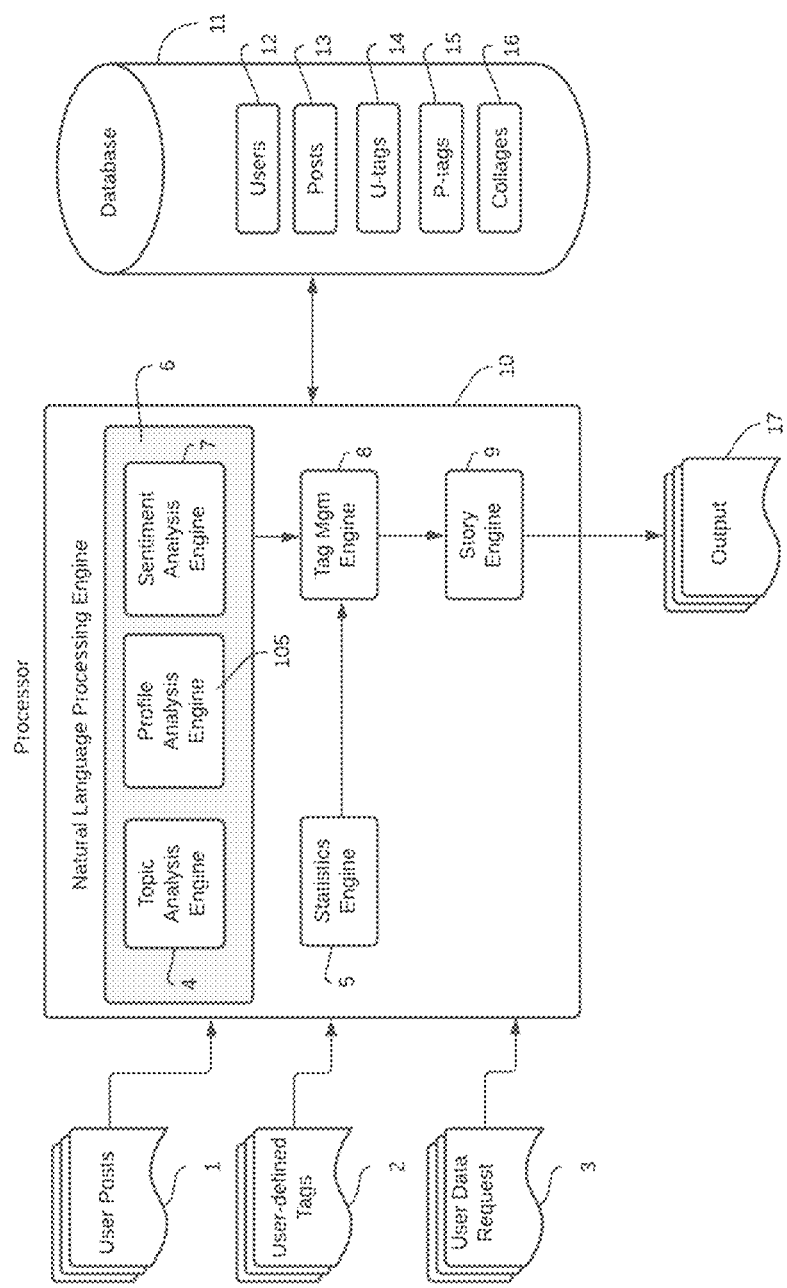
FIG. 1 is a computer system according to the disclosure.

In accordance with an aspect of this disclosure a computer implemented messaging system for organizing and extracting information from messages sent between users of the system is provided, comprising:

a plurality of storage devices;

a network interface in signal communication with the plurality of storage devices configured to receive and store data related to users and posts from users of the messaging system wherein a post is a message that comprises at least one of text, speech, graphics, and video, or any combination thereof, and configured to receive and store user-post-interaction data, wherein user-post-interaction data relates to information associating users with other users or other users' posts;

one or more processors configured to access the plurality of the posts, user-post-interaction data and the data related to users;

the one or more processors configured to generate a set of P-tags and a set of U-tags from the received posts and user-post-interaction data and the data related to users, wherein a P-tag is tag is associated with a post and a U-tag is a tag associated with a user, wherein the set of P-tags and the set of U-tags each have associated therewith a plurality of semantic classes, wherein a semantic class is logical grouping of tags, wherein each P-tag has a value associated therewith and each U-tag has a value associated therewith, wherein some of the values correspond to, or are derived from users' input and, wherein some of the values are generated by a machine learning NLP engine and a statistics engine and a tag management engine; and, wherein the one or more processors in dependence upon keywords and the generated values of P-tags and U-tags is configured to filter and extract information based on a query.

In accordance with another aspect of the disclosure a method of organizing and extracting information from messages is provided, comprising:

receiving and storing posts from users of the messaging system and data related to users of the messaging system, wherein a post is a message that comprises at least one of text, speech, graphics, and video, or any combination thereof and;

receiving and storing user-post-interaction data, wherein user-post-interaction data relates to information associating users of the messaging system with other users of the messaging system or other users' posts;

utilizing one or more processors to process the plurality of posts, user-post-interaction data and data related to users to create and attach a set of P-tags and a set of U-tags to the posts, user-post-interaction data and data related to users;

assigning a value to each P-tag and assigning a value to each U-tag, wherein some of the values correspond to, or are derived from a users' input and, wherein some of the values are generated by a machine learning NLP engine and a statistics engine and a tag management engine; and, filtering and extracting information with the one or more processors in dependence upon keywords and the generated values of P-tags and U-tags.

In accordance with yet another aspect there is provided a non-transitory computer readable medium comprising program instructions stored thereon for extracting information from messages and for causing a computer system having one or more processors and storage devices to:

receive and store data related to users and posts from users of the messaging system wherein a post is a message that comprises at least one of text, speech, graphics, and video, or any combination thereof and configured to receive and store user-post-interaction data, wherein user-post-interaction data relates to information associating users with other users or other users posts;

access the plurality of user posts, user-post-interaction data and data related to users; generate a set of P-tags and a set of U-tags from the received user posts and user-post-interaction data and the data related to users, wherein a P-tag is tag associated with a post and a U-tag is a tag associated with a user, wherein the set of P-tags and the set of U-tags each have associated therewith a plurality of semantic classes, wherein a semantic class is logical grouping of tag;

generate values using a machine learning NLP engine, and a statistics engine and a tag management engine;

receive values from users;

associate a plurality of the generated and received values with a plurality of P-tags and U-tags; and, filter and extract information based on a query, in dependence upon keywords and the values associated with P-tags and U-tags.

In another aspect of the disclosure, a method for extracting and organizing information comprises:

receiving original information via a network from a plurality of users storing the original information using a processor to augment the original information by automatically acquiring and analyzing found information from the web wherein the found information is based on some of the content of the original information and analyzing the original information, wherein analyzing comprises using a machine learning engine and a statistics engine to generate additional information that differs from the original and found information;

wherein the additional information provides connections between elements of the original information;

filtering using some of the generated additional information and using keywords related to the original information.

The original information can be in the form of but not limited to messages or posts or user profile information, user judgement of the posts or other users. The additional information is a network of tags, described hereafter.

To address the above shortcomings in existing messaging systems, a new method and messaging collaboration system, for agile information management and precise information retrieval is disclosed. The disclosure described hereafter, extends on the existing ideas of tagging, in three non-trivial ways: 1) by increasing generality, flexibility and agility j tagging of posts; 2) by applying tags to users and user-post interactions, as an additional source of information in managing content of the on-line messaging system; and 3) by enhancing human tagging with machine learning (ML) algorithms. Once created, tags are used for triggering events, filtering, extracting and presenting information in custom collages.

In the group messaging communication setting, where the objective is to advance projects or insights in a given domain, it becomes practically important to be able to rapidly find value-add information. As the conversation information volume builds up, over time, it becomes increasingly more difficult to find value-add information, without having to revisit redundant, less relevant or outdated components. The advanced tagging disclosure, described in this application, further combined with bespoke rule-based filtering, results in a system capable of more precise retrieval of value-add information.

Research is indicating a clear trend that demand for video content is increasing and that users appreciate viewing videos on messaging platforms in social media. Furthermore, traditional email may, one day, become obsolete with an increasing move towards digital communication. The system described here transcends the traditional messaging platform from predominantly text-based communication exchange into a largely video/audio business experience, as well as encompassing email functionality in a modern way. The former is achieved by connecting the here described messaging system to one of existing multimedia data conversation engines, permitting data format of message submission and consumption to be independent. The new emailing is handled via organized direct messaging between users, with additional functionalities enabling users to—among others—control posting time, receipt time and expected response time—consequently resulting in reduced email traffic and increased productivity.

Another aspect of this disclosure involves automatically creating output reports from the extracted post elements, enabled by the advanced tagging system and rule-based filtering. Furthermore, the user can control the generated output document length and distribution of content. Typical documents may include: summary notes, agendas, feedback reports, task lists, etc.

The following definitions and abbreviations are to be used for the interpretation of the claims and the specification.

A semantic is meaning in language.

A post or a message is a recorded electronic communication or any data that has been encoded. It includes all multimedia data types, such as text, hypertext, URLs, graphics, audio, video etc.

An object is a meaningful or semantic subset of the original post.

Clutter is unwanted message content; or unwanted objects inside the posts.

Collage is a connected group of messaging objects.

Cluster is a group of similar things.

Descriptive Statistics is a summary statistic that quantitatively describes or summarizes features from a collection of information (I.e., posts or users in this context).

Stop words are commonly used words that are excluded from searches to help index and parse text faster. Some examples of stop words are: "a", "and", "but", "how", "or", "what" etc.

DETAILED DESCRIPTION

Figure 13:
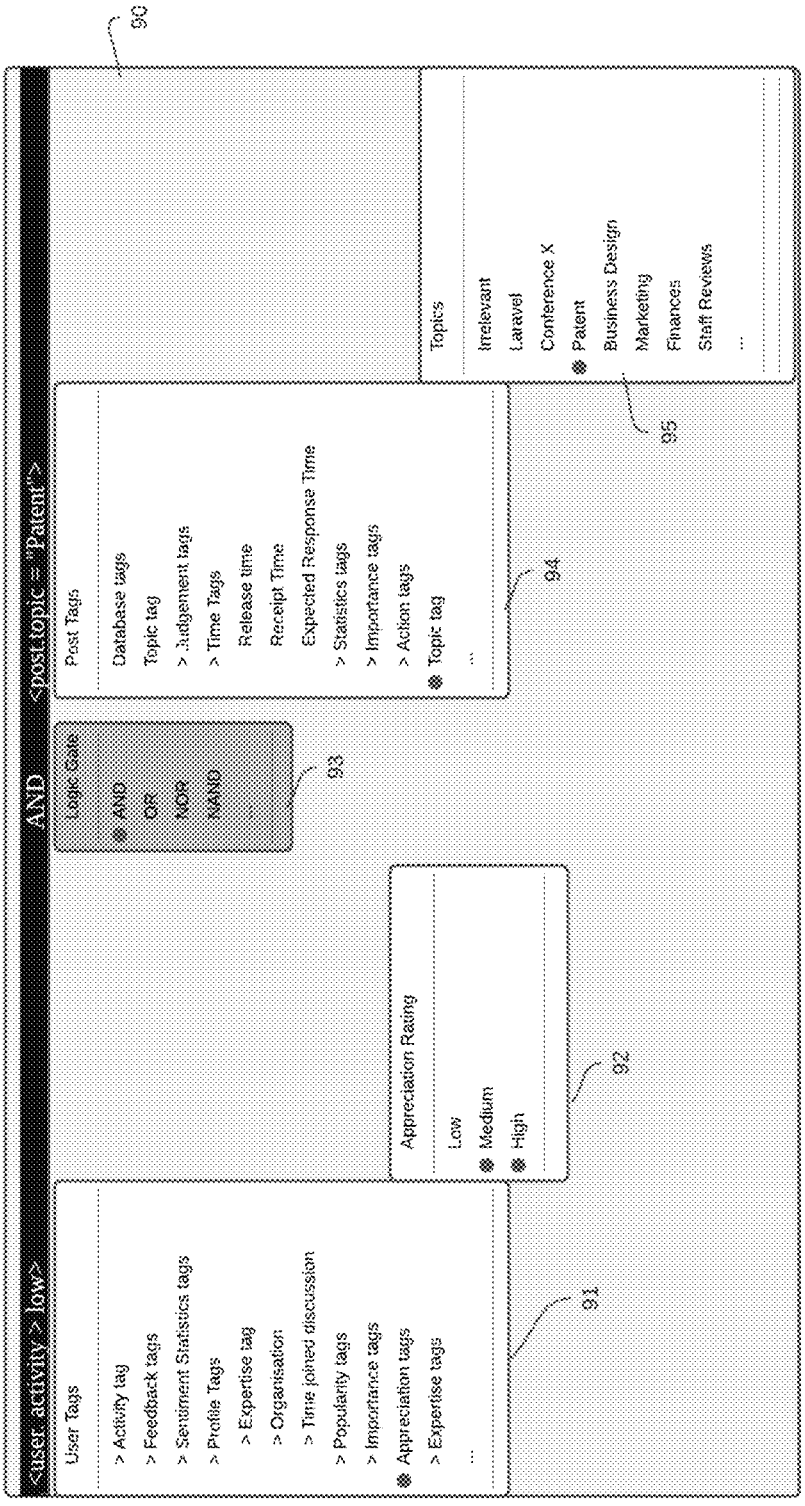
FIG. 13 is one embodiment of the filtering portal.

A semantic messaging collaboration (SMC) system, as shown in FIG. 1, includes one or more data sources, users of the system, a processor 10, and at least one storage device 11. The processor in FIG. 1 is configured to receive input data in the form of user posts 1, user-defined tags 2 or user request for data 3, to generate user (U) U-tags 14, post (P) P-tags 15 and Collages 16, and to store these in the data storage device 11. The Natural Language Processing (NLP) engine 6 includes a Topic Analysis Engine 4, Profile Analysis Engine 105 and Sentiment Analysis Engine 7. Topic Analysis Engine 4 can use unsupervised machine learning techniques to automatically analyze posts in a selected conversation discussion or sub-discussion, and to generate topic clusters. The proposed topics are then reviewed and updated by the user or moderator, before being passed to the topic classification phase. Topic classification uses supervised machine learning methods to label or tag posts according to the received list of topics, resulting in machine learning (ML) defined topic P-tags 15. Profile Analysis Engine 105 analyzes user's profile from available input data or online sources that contain user's personal information, including expertise, education, industry experience, current organization, position etc. Sentiment Analysis Engine 7 uses, amongst others, polarity detection to classify post sentiments as 'positive', 'negative' or 'neutral', and leverage these findings to calculate statistics that could provide valuable user feedback. The Statistics Tag Engine 5 is configured to dynamically collect a plurality of statistics about users and posts in the system and associate the descriptive statistics with the respective users and posts via statistics U-tags 14 and P-tags 15. The Tag Management Engine 8 manages assignment and consolidation of user-defined tags 2 and system-defined tags 18, 19, 21, 22. The story engine 9 receives user request for data 3, with the prescribed length or duration, and desired output data format (i.e. text report, collaged audio or video or other). The request is submitted via the system's advanced rule-based selection and filtering portal in FIG. 13 and consequently presented to the user via output 17.

Figure 4:
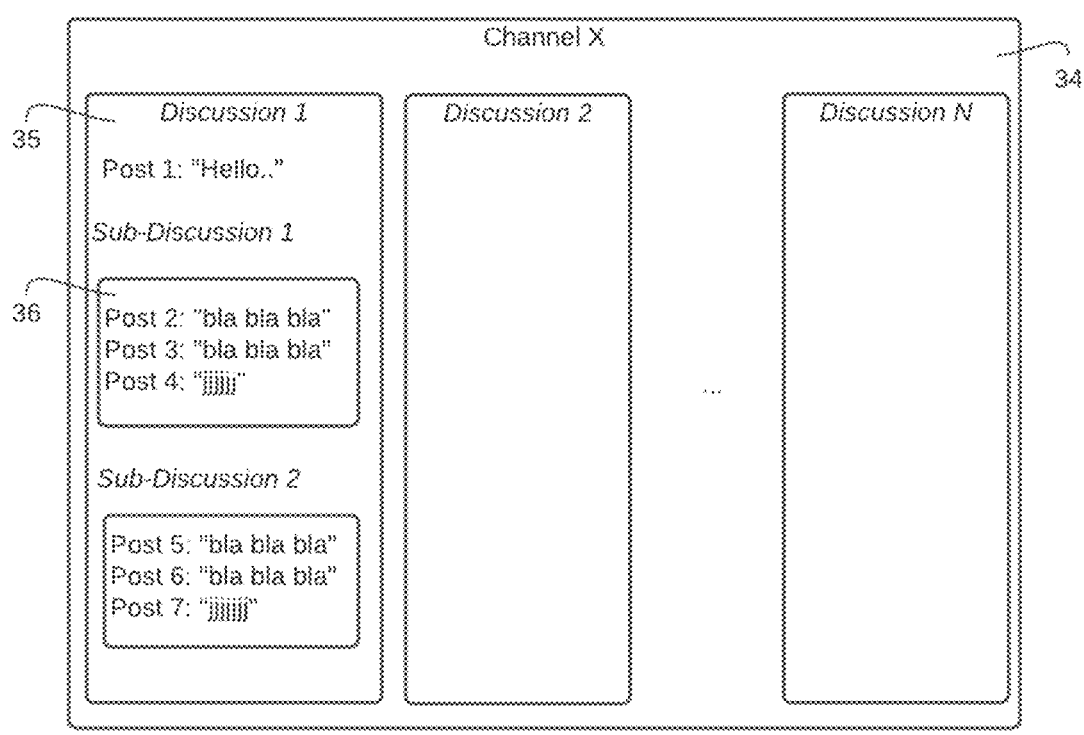
FIG. 4 is a depiction of channel, discussion and sub-discussion.

The SMC system provides an input portal for users 12 to submit their respective posts 1 in a variety of multimedia formats. For example, messages can be submitted as, but not limited to, stylized text format, hyperlinks, URLs, uploaded images, recorded audio or video. This includes users supplying the information directly into the SMC system as well as live meetings, which may be recorded and submitted real-time or subsequently. Furthermore, users can record video content with obscurity filters, which can modify the true recording to appear as, but not limited to, cartoon or pencil animation. This feature enhances communication by protecting a user's privacy and shifts the focus from one's personality to one's ideas. The system also provides various multimedia conversions, such as audio to text and vice versa. Furthermore, the SMC system permits users to control the incoming flow of messages by differing posting and/or receipt time conditional on actions or instructions. For example, conditional instruction could be to receive messages only once per day at 9 am daily, whereas a conditional action could be to receive MIMS once deadline is complete. This is an important feature in reducing messaging traffic and organizing content, whilst supporting retention of focus, and enhancing productivity. Like in other similar systems, users can select to contribute a post to an existing or new channel 34, topic discussion 35 or sub-discussion 36 as depicted in FIG. 4. Here, a discussion 35 is a group chat on a particular subject. For example, in FIG. 4 label "Discussion_1" is a name or subject or topic of the conversation that is contained within that discussion. Inside a given discussion, one can only see posts from that discussion, not the entire conversation in the channel X. Similarly, a sub-discussion 36 is nested inside a discussion 35, containing only conversation pertaining to a sub-topic of a given sub-discussion.

Figure 5:
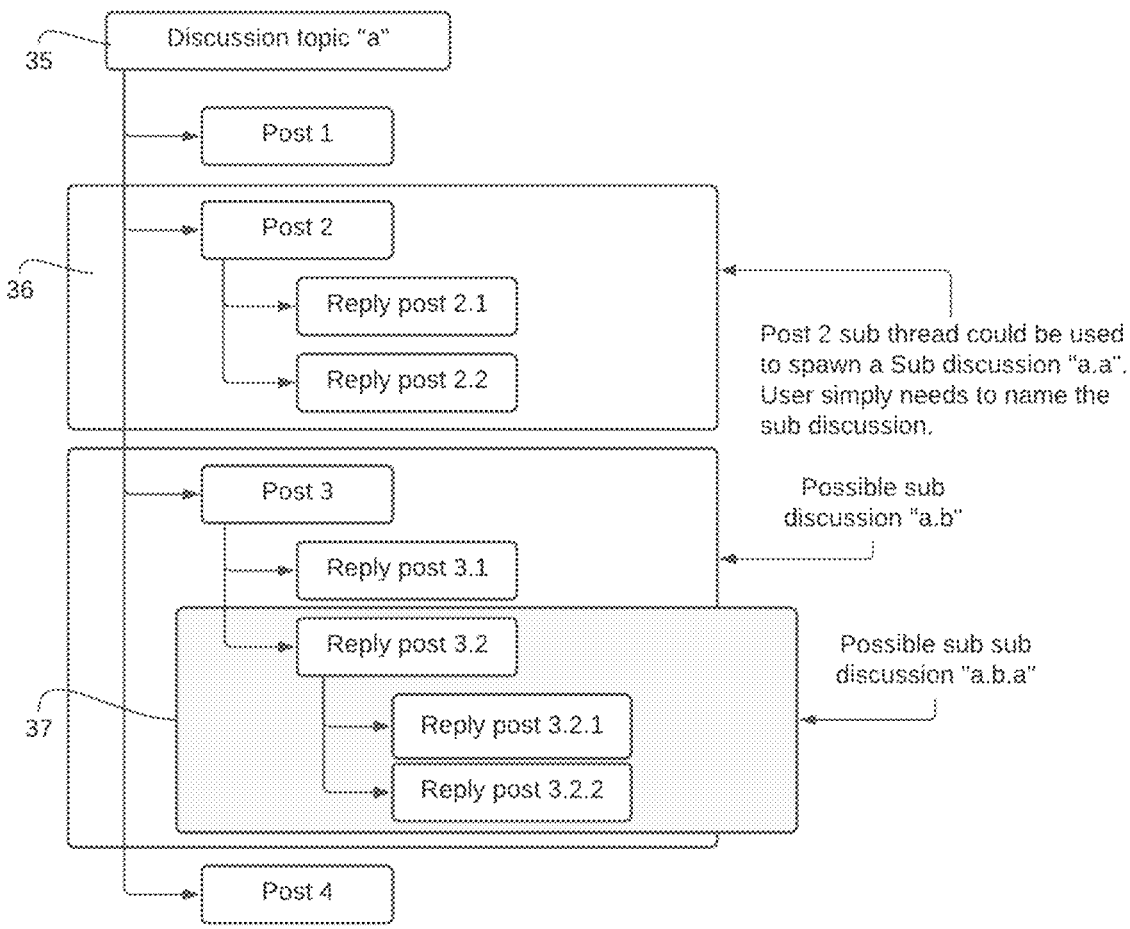
FIG. 5 is a depiction of discussion hierarchy and sub-discussion spawning.

Discussion hierarchy and sub-discussion spawning: Defining a sub-discussion 36, allows it to be listed and found at the discussion 35, channel 34 level. Similarly, defining a sub-sub-discussion allows it to be listed and found at the sub-discussion 36, discussion 35, channel 34 level. The messaging or chat interface of the SMC system is designed to encourage and entice users to respond directly to a post, whilst maintaining a parallel chronological view. For example, an existing commercial software platform Slack™ uses only a purely linear manner of posting, and Facebook™ messaging platform uses a reply to post or reply to reply manner of responding to posts. The SMC interface is designed with a plurality of display modes, including but not limited to: a) Default post/reply view as seen in FIG. 5; b) Linear display where all posts are in chronological order; c) Chat within the post/reply mode and have simultaneously another view visible displaying the posts in chronological order with links to allow navigating to sub threads or sub discussions if defined. A sub-discussion can be spawned spontaneously by the user or alternatively a discussion or sub-discussion can be organised and sorted by topic or subject of conversation, post event. In one example, a group of people could designate a channel dedicated solely to URLs, aggregated by topics of respective web content. Through the tagging system, described hereafter, the group could curate the web content for mutual use and benefit. Similarly, a channel could be dedicated to video, with channel discussions housing "in-house" videos, Youtube videos, Vimeo or other known video platforms. Furthermore, the SMC system has the capacity to automatically assign and sort posts by their type, i.e. URL, video, news update, internal blog article, MEME, meeting recap, announcement, information request etc. This feature can be used to both categorise content as well as restrict post types in the public channels or discussions.

Figure 6:
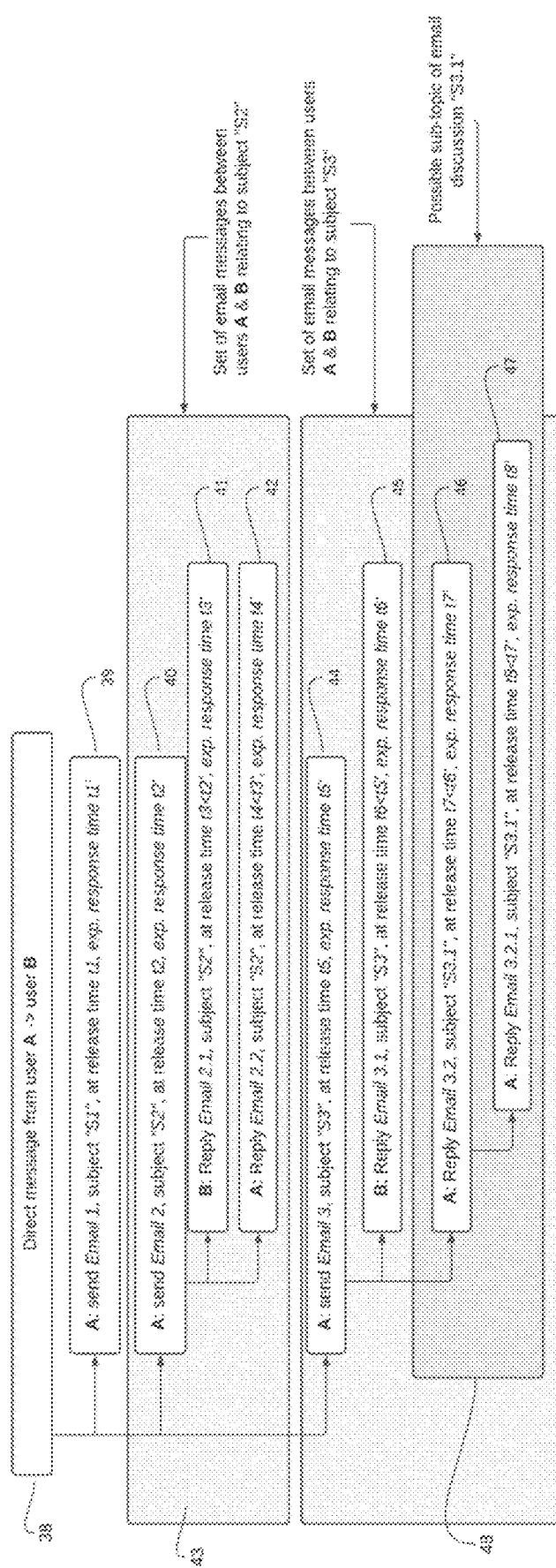
FIG. 6 is a depiction of email messaging with nested subject or topic hierarchy.

Much like other systems, users can also send direct, private messages to other users in the system. However, distinct from existing messaging systems, when using SMC direct messaging, as is illustrated in FIG. 6, the processor may time-delay post send and receipt time, based on set time or even triggers. For example, a time trigger could be setting a timer for sending or receiving a post or posts, based on relative time delay say 20 minutes from now, or specifying a time in the future, say 4.30 pm 23 Jun. 2021. Alternatively, a time delay could be triggered by an event where an event which could constitute a change of value in one of the system tags or something much broader like "when it rains next". An example of delay trigger could be dependent on the change of value in a tag, such as: send message once user A signs off on document X, i.e. Sign_off tag value changes from 1 to 0. Other action tags that could trigger the processor to send or receive a message include: Feedback_tag has changed value after receiving appropriate feedback from user B or Payment_tag value has change after receiving a payment etc. Furthermore, the user may specify the latest time when response is required or expected as well as more traditional subject of the post. FIG. 6 depicts an example conversation 38 between system users A and B, involved in a direct messaging. User A instigates a conversation with Email 1 39, stating the subject of the message as "S1". Furthermore, the system permits the user to send a time differed message. For example, if today was $9^{th}$ February 11.26 am and user A did not want a response on the same day, he/she would select the release time of Email 1 to be close of business, i.e., $9^{th}$ February at 5 pm. It just happens that message 39 is important and resolution is required by $20^{th}$ February, therefore user A selects expected response time to be by 5 pm $19^{th}$ February. This in turn enables user B to prioritize his/her work in relation to expected response time. In fact, user B could even ask the system not to display any emails that do not require attention on that day. This feature not only replaces the concept of traditional email, but further enhances it by enabling users to effectively prioritize work and slow down and reduce email traffic. Additional feature of the system is to permit nested topics 48. For example, in FIG. 6, user A commences another conversation with user B via Email 3 with subject "S3" 44, to which user B responds with Email 3.1 45. However, this time instead of replying under the same subject, user A decides that the content of the email is relating to a subset of topic "S3" and therefore responds under subject "S3.1" 46. The sub-topic allows the email to be listed and found under both subjects "S3" and "S3.1", whilst creating a logical hierarchy and organization of the messaging content.

Figure 15:
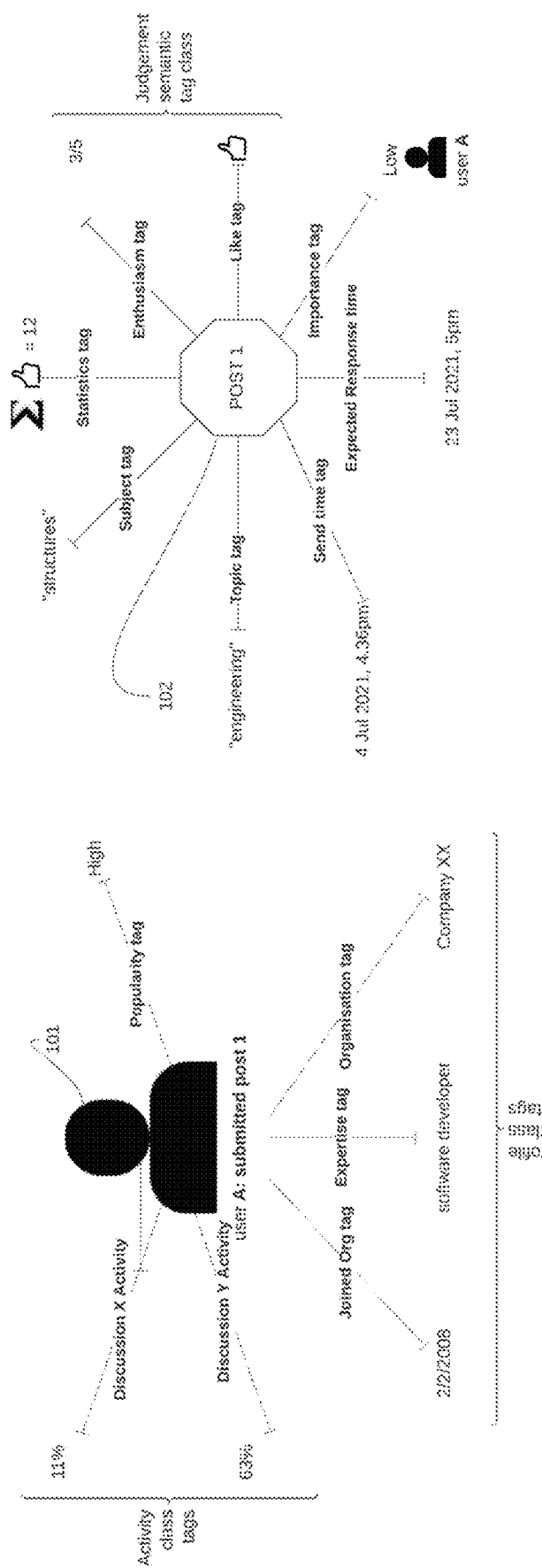
FIG. 15 shows a user-post neuron.
Figure 17:
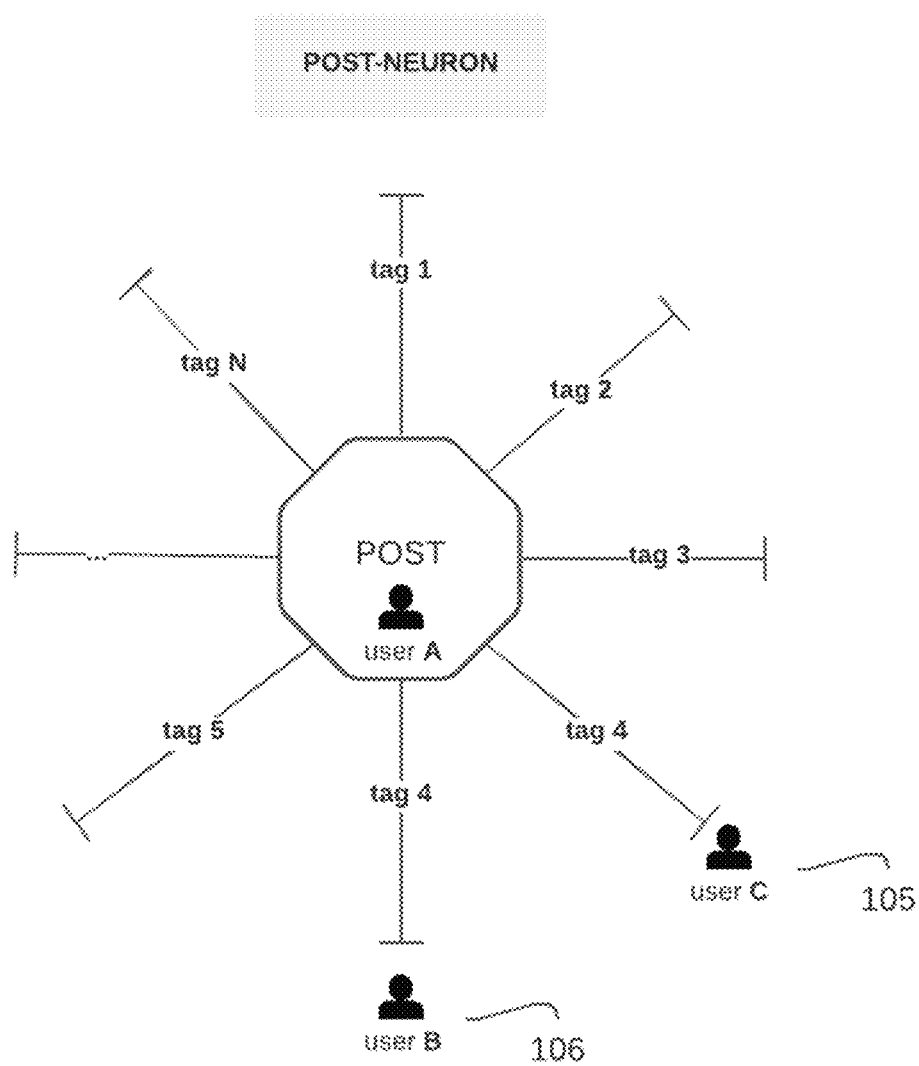
FIG. 17 shows an abstract post-neuron.

Tags: A new semantic tagging system is disclosed. The core concept behind a semantic tagging system is one of creating and associating a network of tags with posts 13, users 12 and user-post interactions, to create handles on valuable information for future extraction. The system distinguishes two types of tags which incorporate the above mentioned information: 1) tags that are associated with posts 13 and 2) tags associated with users 12. A set of tags associated or attached or assigned to posts (P) will be referred to as P-tags 15, and likewise a set of tags associated with users (U) will be referred to as U-tags 14. However, note that some tags associated with the post are also dependent on users, and vice versa some user tags are post dependent. We will refer to a post with all the attached P-tags 15 as a post-neuron 102, and likewise a user with all the U-tags attached as a user-neuron 101. An abstract example of a post-neuron is shown in FIG. 17, depicting at its core a post sent or posted by user A. The lines attached to the post represent associated tags. The tags are essentially labels or logical containers to which values are later assigned to by the users. Some of the tags will be created and assigned values by the user who posted the message or a post—i.e. user A in FIG. 17, while other tags will be created and assigned values by other users of the system—i.e. tag 4 in FIG. 17 has two values assigned to it, one by user B and another by user C. Therefore, tags represent a set of non-directional input/outputs codes for post and user-neurons 102, 101. In other words, tags provide a semantic communication layer between posts, users and posts-user interactions. The tags are logically organized into semantic classes 97, as shown in FIG. 15. Note, this logical grouping of tags may be expanded into a hierarchy of any depth, whereby each layer in the hierarchy provides meta-data about the layer below, and where the tags themselves constitute the lowest layer of meta-data. Once a user submits a request for data in the system, the neuron links are activated and the system comes to life as a network of interconnected post and user neurons, from which precise information can be extracted. This is discussed in more detail in the filtering portal and output generation sections.

Figure 14:
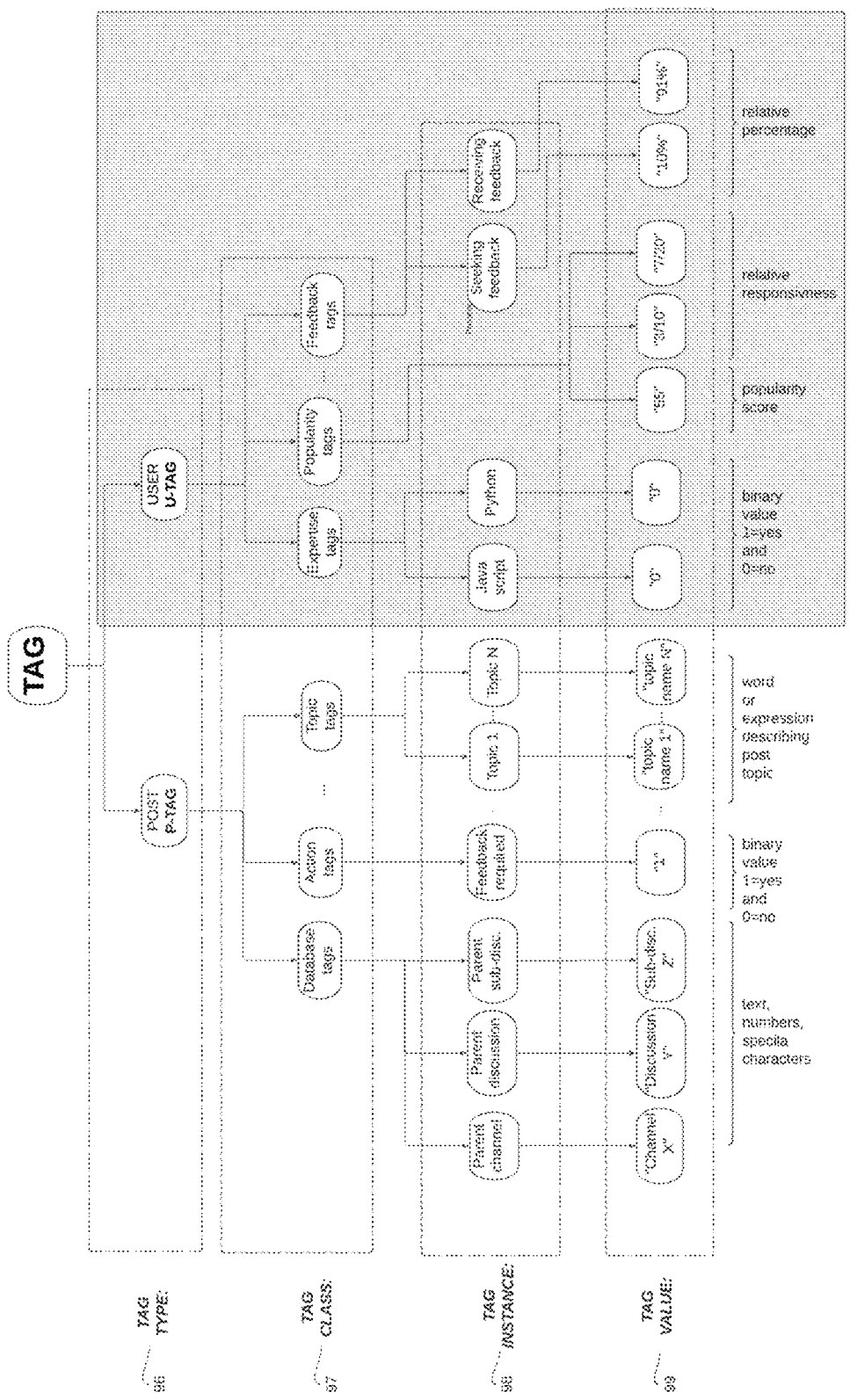
FIG. 14 shows a hierarchy of tags.

A detailed tag hierarchy is shown in FIG. 14. P-tags 15 and U-tags 14 will be referred to as tag types 96. Each tag type contains a plurality of tags that are logically grouped into semantic classes 97—we will sometimes refer to these as classes. This is essential to get the most benefit out of the system, to both reduce confusion to other users and enable more effective utilization of tags. Each sematic class, in turn, contain at least one tag instance 98 which, from here in, we will refer to simply as a tag. Each tag 98, as shown in FIG. 14, can take on a value from a set of available categorical or numerical options. For example, a tag denoting information about user's enthusiasm about a post, may take one of three categorical values: "Don't like it", "Neutral" or "Like it very much". Alternatively, the same rating could be offered as a numerical choice of integer values between 1 and 10, where 10 is the highest positive rating. The range of values a tag can assume denotes the tag resolution, and cumulatively contributes to the system's resolution. In the above example, the resolution was higher when the tag had a range of 10 numerical values, compared to three categorical values. Note, the resolution can be changed for any given tag throughout the life of the system; typically by the administrator. The system resolution dictates how precisely the information can later be extracted from the system; the higher the resolution the better the accuracy. However, the choice of desired resolution must be balanced with human capabilities to easily place judgement when presented multiple choices. Too many choices can lead to paralysis and less accurate judgement, which is counterproductive. Although the system comes pre-loaded with an initial semantic tagging system, it has the capacity to grow and evolve. This means that new semantic classes can be added, as well as new tag instances (tags) and their associated value ranges. Furthermore, all tags are dynamic, in that they can change throughout the lifetime of the system. Tag values can be either input by the users, referred to as user-defined tags 2, or generated by the semantic messaging system. More specifically, tags may be generated by natural language processing (NLP) engine 6, which we will refer to here as machine learning or ML-defined tags, by calculating various statistics in the statistics engine 5, or by extrapolating information from the stored data in the database, in the tag management engine 8, resulting in system tags. The associated tags and their portrayal in the system's user-interface may take any data format, including text, categorical, numerical, graphical and symbolic representation.

Figure 2:
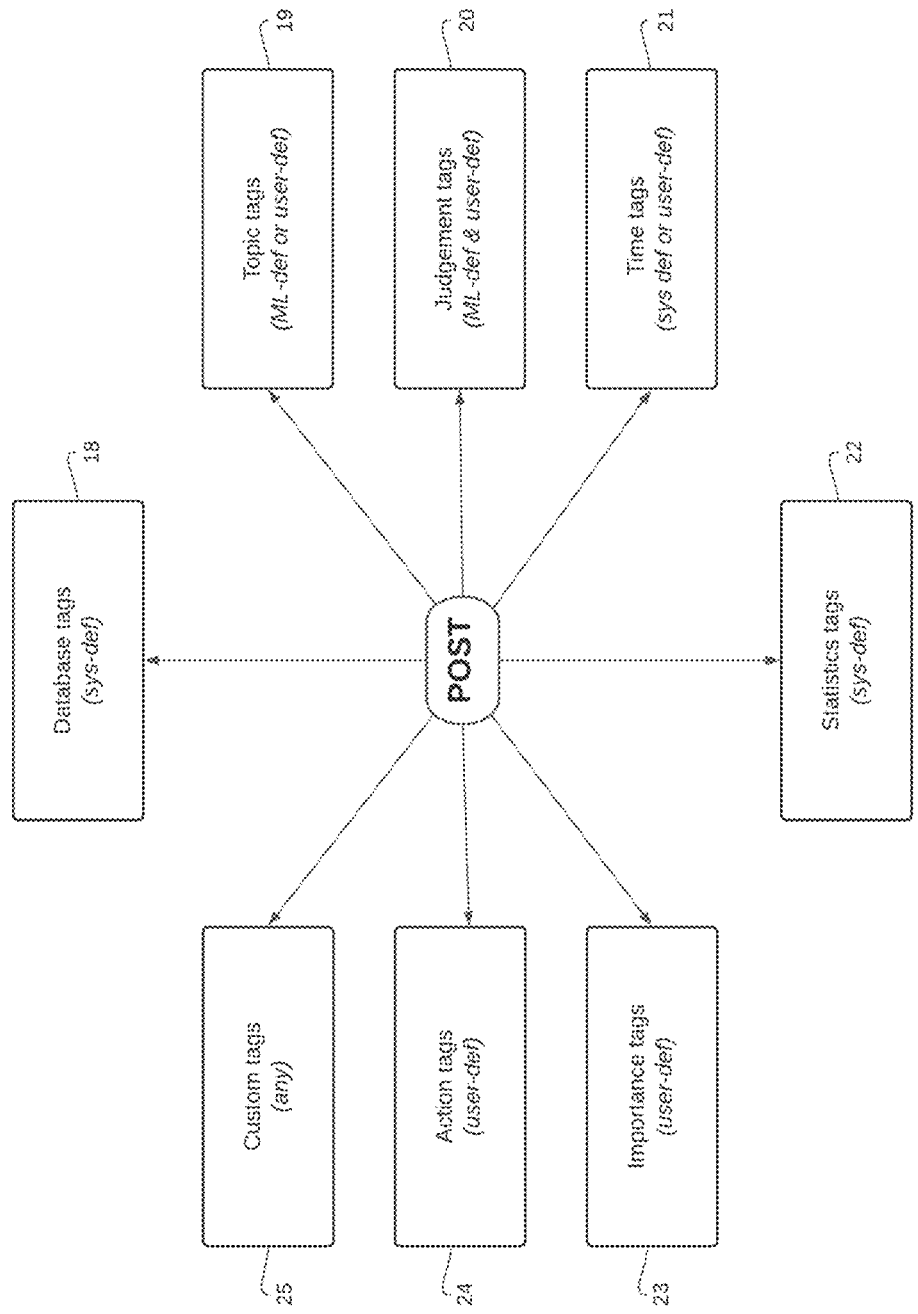
FIG. 2 is an example of some of the tags associated with a post.

In one embodiment, tags associated with a post, comprise a plurality of P-tag 15, logically grouped into semantic classes as shown in 97 of FIG. 14 and FIG. 2. Note, these are neither exhaustive or immutable, and more classes are anticipated to evolve as the users interact with the system.

Moving clockwise around FIG. 2, starting at 12 o'clock, let us consider some of P-tag semantic classes in more detail. Database tags 18 comprise a set of system defined tag instances 98, extracted directly from the database. That is, any information relevant and associated with a post that is available and can be extracted from the database. For example, all parents of the post or stored message timestamps etc. In FIG. 5 sub-sub-discussion 37, post 3.2.1 has parent posts 3.2 and 3, parent sub-discussion "a.b" 36 and discussion "a" 35. Topic tags 19 can be either user-defined or generated by NLP engine 6, by analysing post content, in the topic analysis engine 4. The same topic can be assigned to a cluster of tags, informing their subject of conversation and inter-connectedness. Conversely, a single post can have many topic tags assigned to it. For example, a set of messages containing a hyperlink could be automatically tagged as URLs. Furthermore, the topic analysis engine 4 couls also be employed to analyse the content pointed to by the hyperlink, thus creating sub-topic categories under the topic URL. Likewise, a set of news feeds could have a topic tag news_feed. Messages could also be manually assigned a topic tag by the user or administrator, for example meeting_recap, announcement, information_request etc. Judgement tags 20 are a set of tags representing a human or machine judgement about the post. One example is a well-known "Like" button expressing a binary judgement on the post: like or neutral. In another embodiment, SMC system enables a more refined scaled judgement by using "Enthusiasm rating" signifying the degree of enthusiasm about the post. This tag could be used for decision making and reaching consensus, surveys or voting. Sentiment statistics tags are another example of judgement class tags, which can either be created by the user or generated by the NLP engine. The ML-sentiment tags can be generated by Deep Learning in the Sentiment Analysis Engine 7, which pairs many examples of natural language with labels about positivity or negativity, or even finer spectrum if required, thus developing agents that can both learn and understand sentiments underlying the messages or posts. The sentiment tags are used to generate sentiment statistics for users, providing valuable feedback. Time tags 21 are a set of tags a user can attach to their own posts, for example, in order to control message release and receipt time, specify expected latest response time, etc. The use of these tags promise improvements in reducing spontaneous messages of little value, differing emotive conversations by allowing messages to sit before impulsively sending, and more. Statistics tags 22 are a set of descriptive statistics associated with the post. One such example is tally of thumbs up, which indicates the relative group interest in the post or idea. Importance tags 23 are a set of numerical tags assigning relative importance to the post. These can be assigned by both the user posting the message as well as users consuming it. Therefore, there would be a set of user-importance pair ratings which can be used as additional source of information management. For example, if a user was away on a holiday for a couple of weeks, he/she can catch-up on missed conversations by only looking at posts rated as important by the users they trust. Action tags 24 are a set of tags with the associated timer for when an action is required. For example, a user may seek feedback by raising a Feedback flag by setting Feedback tag to say value 1 for User B, if feedback is required from this particular user. Once feedback is received the tag automatically changes to 0. This tag is especially useful for progressing and refining ideas in the context of on-line collaboration. Alternatively, other action flags could include a Signature tag indicating that certain information needs to be signed or Payment_req denoting that payment is due etc. Custom tags 25 denotes bespoke user-defined class of tags that can incorporate any custom user needs.

Figure 3:
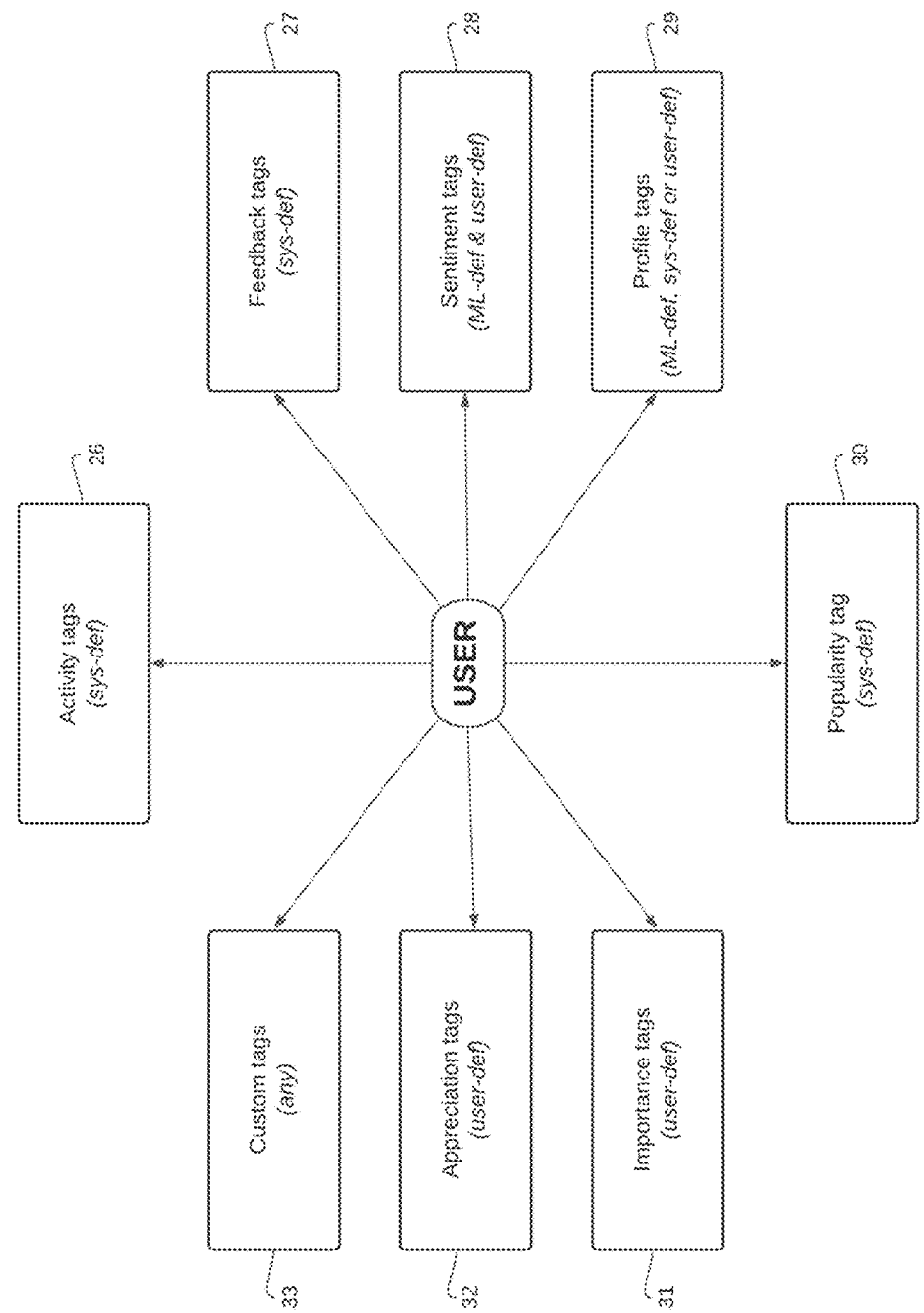
FIG. 3 is an example of some of the tags associated with a user.

In one embodiment, tags associated with a user, comprise a plurality of U-tag 14 semantic classes as shown in FIG. 3. Note, these are not exhaustive; unlimited custom tags and classes are supported by the system. Moving clockwise around FIG. 3, starting at 12 o'clock, let us consider each user tag class in more detail. Activity tags 26 are a set of tags measuring user activity statistics. For example, one tag instance in this class could measure user's activity in relation to each topic and relative to other users in that topic-group, or it could measure user's cumulative activity in all discussions. Another instance could measure, as well as graphically display—say a pie chart, of how a user is investing their energies across all discussions she/he is involved in. The possibilities are only limited by the available statistics that can be drawn from the system. Feedback tags 27 are a set of tags relating to user feedback statistics. In a way, feedback tags are a subset of the statistics-class tags 26, specifically relating to user feedback actions. For example, relative frequency of seeking feedback or providing feedback to others. Practically, these serve as one of the collaboration participations measures. Seeking feedback speaks to user willingness to expose their ideas for group feedback, whereas providing feedback is willingness to hear and contribute to other's ideas. Leveraging Natural Language Generation (NLG) and based on the feedback tags, SMC can generate a feedback report at users request. Sentiment statistics tags 28 are a set tags, these tags describe the frequency of user's cumulative "positive" or "negative" sentiment towards other's ideas. Other tags in this class include statistics around inappropriate language, or divergent exclusive posts. Sentiment statistics tag values are generated from the plurality of sentiment P-tags. These tags are a useful feedback mechanism for user reflection, growth, self-moderation and ultimately more productive collaboration. They relate to user's sense of group psychological safety, or how a user has contributed towards psychological safety of others. A recent study by Google™ has found that the common link between high performing teams is not so much who is on the team, but whether the members feel safe to share their ideas in their group. Profile tags 29 are a set of text-based tags describing a user profile. Profile tags may be added by the user about themselves or about others. For example, this may include user's current employer, group or division, position in the organisation, education or experience attributes, date joined team or discussion etc. For example, in the context of software development a person could be assigned expertise level in Java script or Web development etc. Alternatively, this information could also be automatically extracted by the SMC system, from a curriculum vitae (CV) or social media feeds using machine learning algorithms in the Topic Analysis Engine 4. The process essentially involves segmenting the respective information source based on the topic using topic classification (explained more above) and extracting data in structured form. Popularity tags 30 are a numerical statistics tag measuring cumulative records regarding popularity of interest in user contributions. One example is a cumulative tally of all thumbs up the user has received over a period of time. Many variants of this tag can be implemented in order to gain the most informative statistic. Importance tag 31 is a numerical importance rating assigned by the user to other users in their group. Preferably this is a private tag reflecting relative importance of others in the group to the user of the system. For example, in one embodiment it is related to other's positional hierarchy in the organisation (i.e. the boss) or respect or obligation assigned to an individual. Appreciation tags 32 are a set of symbolic or numerical tags representing appreciation or confidence in user contribution, relative to a topic. Unlike the Importance tag 31 which is associated with user's title or general relationship, appreciation tags 32 are topic specific and reflect a confidence level about particular user's contribution on a given subject. This tag is a useful filter when one is interested in accessing the summary of the conversation. Custom tags 33 are a set bespoke tags that users can create to support any custom needs not already covered by the existing tags.

Natural Language Processing (NLP) engine of SMC system disclosed, comprises Topic Analysis Engine 4, Sentiment Analysis Engine 7 and Profile Analysis Engine 105. The Topic Analysis Engine 4 is used to analyze the topics of the posts to generate topic-P-tags 19, Profile Analysis Engine 105 analyzes CV's and other personal user information to generate user profile-U-tags 29, and Sentiment Analysis Engine 7, analyzes sentiment of the posts (i.e. positive or negative messaging) to generate Sentiment-U-tags 28. Finally, the story engine 9 generates output reports, such as notes, summaries, presentations etc.

Figure 7:
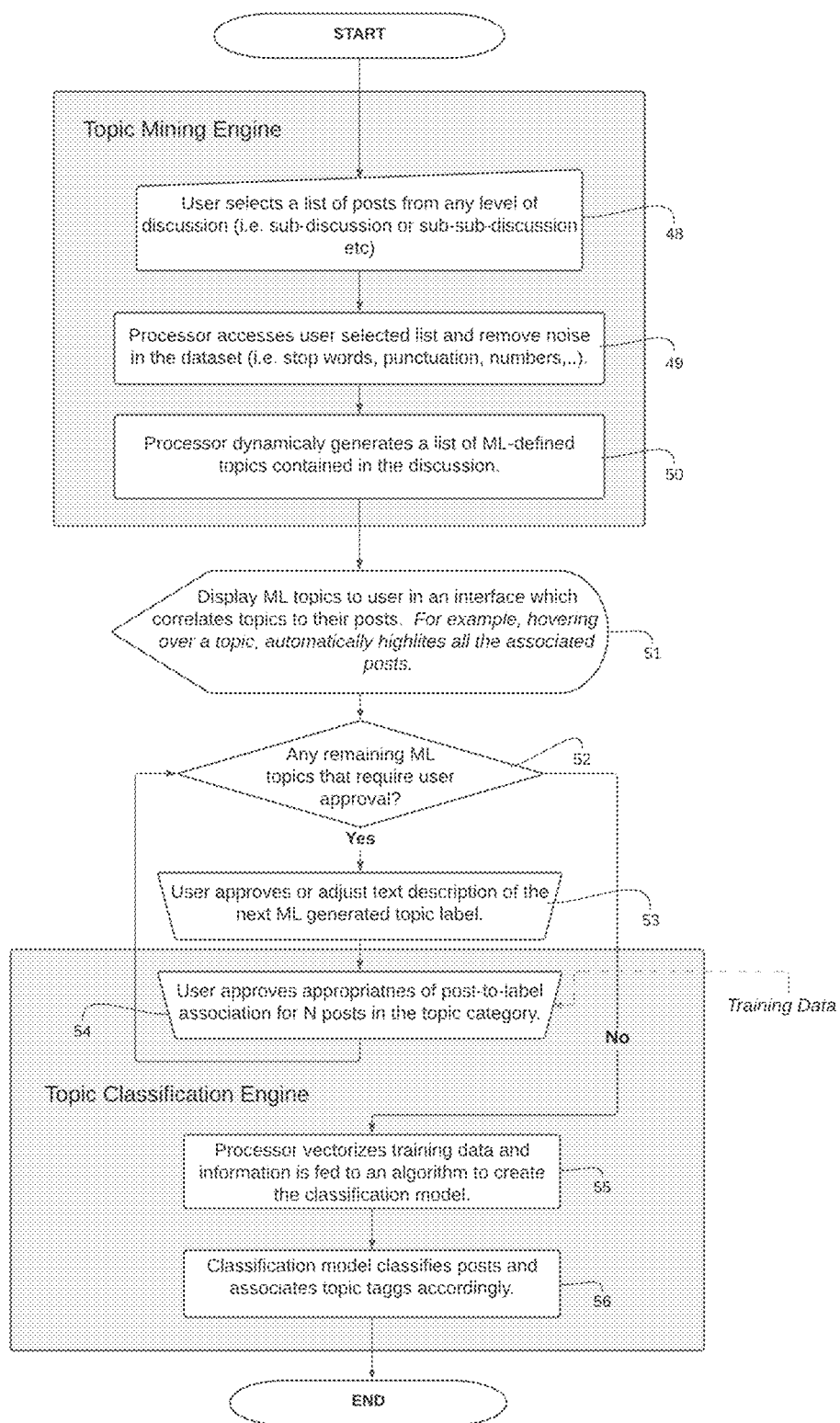
FIG. 7 is a natural language processing engine for generating ML topic tags.

Workings of Topic Analysis Engine 4 in the contexts of generating topic P-tags 19, is depicted in FIG. 7. It comprises three distinct components: 1) Topic Mining phase, 2) User review/manual input and 3) Topic Classification phase. The Topic Mining phase, as the name suggests, automatically identifies topics that are present in the selected text. It does so by clustering similar posts under topic words or expressions that it used to infer these relations. Being an unsupervised Machine Learning (ML) technique, means that it does not require manual input from the human. However, these algorithms need large volumes of high-quality data to gain satisfactory performance. For this reason, we would not apply topic modelling to individual posts, but rather collections of posts. The procedure begins with a user selecting a list of posts from any level of discussion, including but not limited to sub-discussion or sub-sub-discussion 48. The Topic mining of NLP engine 7, in processor 6, assesses the user selection and removes noise in the data 49. This pre-processing phase removes any unnecessary information such as punctuation, stop words (and, or, the, a, what, etc.), numbers, and other data that could be considered clutter in the context of topic mining. Next, the topic analysis engine 4 applies use one of the existing techniques or their variants to generate a list of topics 50, including: Latent Semantic Analysis (LSA), Latent Dirichlet Allocation (LDA), Non-Negative Matrix Factorization (NMF), Parallel Latent Dirichlet Allocation (PLDA), Pachinko Allocation Model (PAM) etc. The underlying assumption with all of these methods is that a pre-selected collection of posts comprises a mix of topics. The processor applies one of the topic modelling methods to determine which topics are present in the user selection and how strong that presence is. For example, LSA is one of the most frequent topic modelling methods. It is based on a distributional hypothesis which states that semantics of words can be understood by considering the context where the words appear. Therefore, if two words appear in the same context then their semantics will be deemed similar. Here, the LSA would compute how frequently words appear in the individual posts, as well as the selected collection of posts. Those skilled in the art will understand how to compute the word frequencies using standard techniques like Term Frequency—Inverse Document Frequency (TF-IDF)—which is a statistical measure that evaluates how relevant a word is to a post in a collection of posts. Once TF-IDF has been computed, the next step is to create a matrix containing word counts per post, where rows represent unique words and columns each post. Singular value decomposition (SDV) is then used to reduce the number of rows, and posts are compared by taking a cosine of the angle between the vectors formed by any two columns. Similar posts will result in values close to 1, whilst dissimilar posts will have values close to 0. The LDA, on the other hand, requires us to decide in advanced how many topics will be contained in a selected text, followed by an iterative process of topic assignment for each word in each post being analyzed. This is a popular topic modelling technique, with a solid performance in application containing less than 10,000 topics—which is almost always the case in a typical on-line discussion or sub-discussion.

As a result, a user will be presented with a list of topic words 50 or expressions that the engine has associated with the pre-selected list of posts. It is anticipated that this would be relatively small and manageable list. If using an LDA model the user would in advance, select a number of topics they would like to segment the text into. These are intuitively displayed in the system's user interface, where hovering over a presented topic, automatically highlights all the associated posts. A user or moderator of the discussion is then asked to iteratively scroll through this list and approve or correct the topic names/labels in order to more accurately reflect human understanding of the associated text-based content 53. Note, the topic mining phase if optional. It is quite feasible to completely skip this phase and begin the topic classification by moderator providing a topic list based on domain expertise.

Topic Classification takes as input a pre-defined list of topics, resulting from 53. In step 54 the user starts training the classification algorithm by approving or modifying the appropriateness of the topic labels with respect to the associated post cluster, generated in the topic mining phase. This process requires user to simply tick for approval, each topic-post match where the topic label provides sufficiently descriptive information about the content of the post. Once enough approved matches are completed by the moderator, the algorithm starts tagging the remaining posts automatically. Note, if topic mining phase was skipped then the moderator needs to manually associate and assign sufficient number of tags to the posts, for the classification algorithm to succeed. In step 55, topic classification engine transforms text information into vectors, using techniques such as bag of words vectorization. Recently, deep learning has been transforming text vectorization, by finding better ways to represent text. Once the text is transformed into vectors, irrespective of the text vectorization technique used in the prior step, this information is fed to the algorithm, along with the trained data set, to create a classification model. The classification model 56 can then classify new posts, because it has learned how to make predictions automatically. The more training data is provided, the more accurate the classification. Some of the widely used algorithms for topic classification include: Naïve Bayes (NB), Support Vector Machines (SVM), Deep Learning, Hybrid Systems etc. Naïve Bayes is a family of simple probabilistic classifiers, based on applying Bayes theorem, and is suitable for small amounts of data, say 1,000 to 10,000 posts. SVM is slightly more complex, but often delivers better results than NB for topic classification. Deep Learning algorithms require much more training data than the former two methods, where the number of trainings samples jumps from 1,000s to millions. The system disclosed here adapts classification models to evolve with the data volume and maturity of the system.

With time, it is expected to improve the accuracy and precision as it is learning from humans using the system. Here, accuracy is defined as the percentage of posts that were assigned the correct topic; and precision as the percentage of posts the classifier tagged correctly out of the total number of posts it predicted for each topic.

Figure 8:
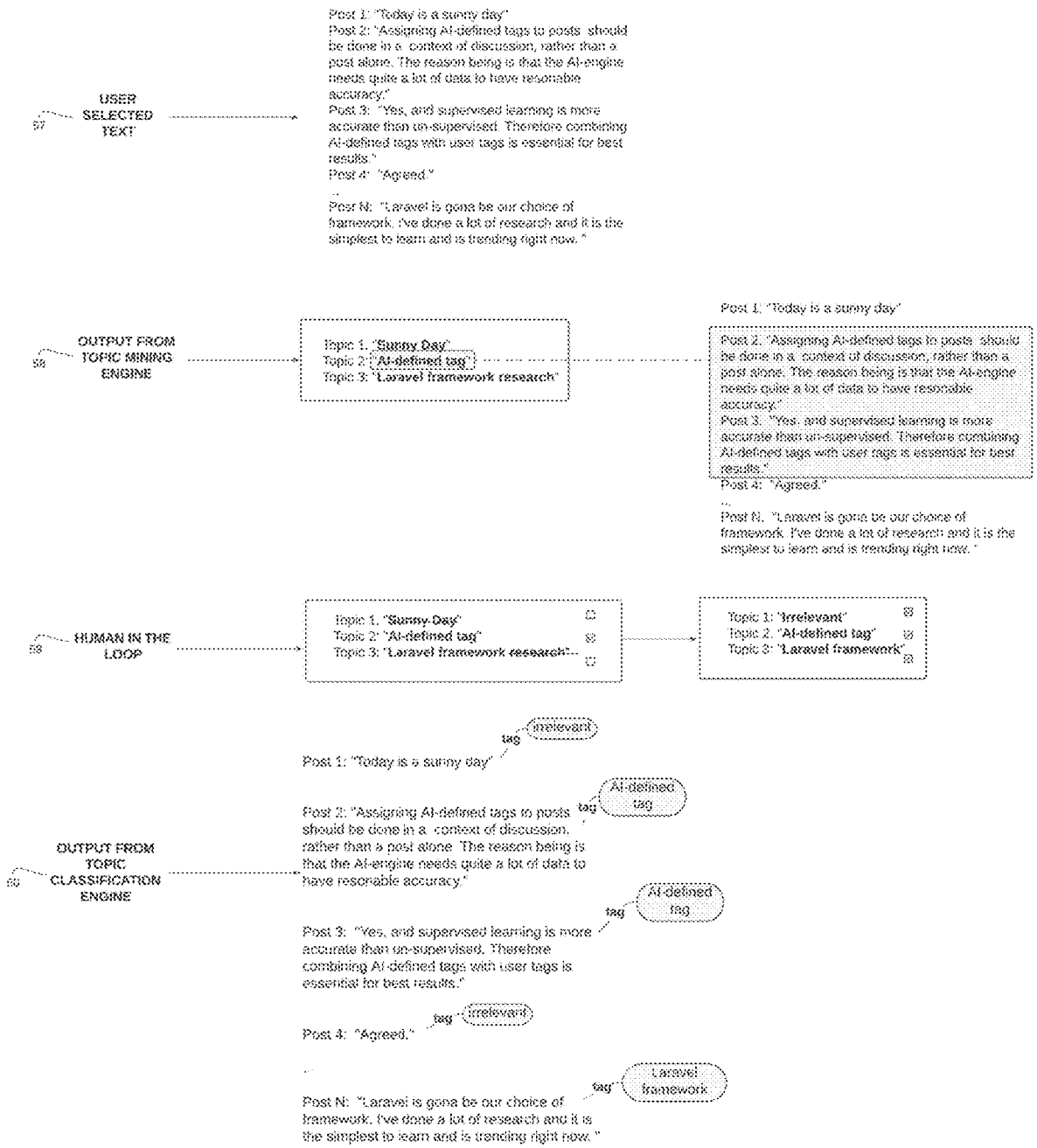
FIG. 8 is an example of NLP applied to classifying posts by topic.

Natural Language Processing (NLP) engine 6 used for topic classification of posts: FIG. 8 provides an example of NLP engine applied to classifying and tagging posts based on their topic. 57 represents a fictitious example of a user selection. It consists of a list of posts 1 to N, which could be a subset of an existing discussion or sub-discussion or sub-sub-discussion etc. This list is then received by the topic analysis engine 4, which, in this case, happens to identify three topics present in the list of N submitted posts: "Sunny Day", "AI-defined tag" and "Laravel framework research". These are presented to the user, via a graphical user interface (GUI), in 58. The human in the loop part of the process, 59, requires manual input by the user or moderator of the respective group discussion or sub-discussion. In this case the moderator reviews the three topics presented and decides to keep topic 1 but rename it from "Sunny Day" to "Irrelevant". He/she is happy with the second topic label and simply ticks a box to approve. Lastly, the user/moderator accepts the third and final topic label/tag with only minor modification where the word "research" is removed. This revised topic list is then passed to the topic classification to automatically classify any remaining posts in the original user selection. The output of this process is shown in 60, where each post now has an associated topic tag, stored as a P-tag 15 in the system.

Workings of Sentiment Analysis Engine 7: Businesses are increasingly relying on social media as their marketing platform, allowing them to reach a broad audience without intermediaries. However, there is so much information that it is difficult to quickly detect negative social mentions which could harm the business. In order to monitor emotions in social media conversations, businesses are leaning to sentiment analysis to rapidly understand their audience. Sentiment analysis is essentially an automated process for identifying and classifying subjective information in text, such as opinion, judgement or feelings about something. The most common type is the polarity detection, where sentiments are classified as 'positive', 'negative' or 'neutral'. Like Topic Analysis Engine 4, automatic sentiment analysis involves supervised machine learning classification algorithms, where unsupervised machine learning algorithms are used to explore the data—such as Linear Regression, Naïve Bayes, Support Vector Machines etc. Although humans can easily define context and polarity, the challenge is configuring the algorithm to get the same results. In order to handle context, we need to use text vectorization to map connections between words and their relations to each other as part of human speech. This is an essential foundation for proper understanding of tone and mode of message. Tools like word2vec and doc2vec can do this with ease. Algorithmia provides sentiment analysis algorithms to developers, where implementation is as simple as calling REST API and requires no server setup. In particular, social sentiment analysis is an algorithm tuned to analyze the sentiment of social media—which would be directly applicable in SMC system. The algorithm takes a string and returns the sentiment rating for the 'positive', 'negative' and 'neutral', as well as the overall sentiment of the string. For the purpose of generating sentiment P-tags and sentiment statistics U-tags, the system would initially provide polarity analysis, however it is anticipated to include any type of sentiment analysis that would support continued human-machine learning. Although performing sentiment analysis is not new, the application of it in the context of a messaging system to upgrade human communication is novel. Humanity is learning to learn together whilst managing the risks of sharing our thoughts, ideas, disclosing feelings and sentiments, making and admitting mistakes, asking sensitive questions or challenging assumptions. Every complex project team that is stood up to address a novel, adaptive challenge is a new human system bringing together diverse sets of individuals with unique personalities and competing commitments. When using an SMC system to collaborate on such projects, sentiment P-tags and U-tags are used to generate user feedback reports, which can support individuals working in a shared context to enhance their emotional, social and cognitive competencies. Self-moderation based on such feedback would result in an improved collaboration, giving everyone in a team or discussion a better chance to have a good hearing and enabling individuals to speak in their authentic voice more often thus enabling creativity and innovation by encouraging and including diversity in conversations.

Generating ML Profile user tags: The user U-tags from the profile semantic class can be either user defined or generated by a machine learning algorithm which scans CV's or any available personal information on the social media, noting privacy considerations. Machine learning has recently been emerging as a strategy to help employers conduct talent sourcing and recruitment. In particular, companies are training ML algorithms to automate repetitive aspects of the recruitment process, such as resume, application review and candidate scoring. Whereas such software initially requires parsing the job specification for various keywords/skills, in the SMC system the moderator would simply select desired words or attributes of interest, i.e. Java or Integer Linear Programming (ILP0 skills. The algorithm would then search the web for the user's CV, LinkedIn account or other social media trace. Once a CV or equivalent information source has been located, it would be segmented into units for processing. In one embodiment, a feature extraction would be performed in the "skills section" of the CV. The time series could then be used to rank how much the user has practically used their qualification, assuming industry experience is more valued than qualification itself. Other elements could be analyzed and information extracted, such as job hopping, grades at university, communication skills etc. Topic classification algorithms, discussed earlier, would also be applicable here.

Statistics engine 5 handles calculation of all the required statistics in the system. These are primarily descriptive statistics utilized for creating certain U-tags 14 and P-tags 15. Descriptive statistics summarize and organize characteristics of data, in this case data about users 12 and posts 13. Each time a user contributes a post he/she adds information to the system's live data set, at that point in time. The statistics engine 5 dynamically updates all the statistics in the system at regular time intervals—in one embodiment this could be daily or hourly. Some of the typical descriptive statistics can be categorized in three main types: 1) distribution statistics—which concerns the frequency of each value, 2) central tendency statistics—which look at averages of values, and 3) variability or dispersion statistics—concerning how spread out the values are. Those familiar in the art will find the required calculations both standard and relatively simple. The unique aspect is how these statistics are applied to achieve practical benefit for the users. In this disclosure, the system collects various cumulative statistics, as described in more detail in the tagging sections, such as a tally of thumbs-up to measure relative interest in a post 22 or popularity of a user 30. Another example is the relative cumulative or average daily/weekly activity of users in the group-discussion, or a spread of contributions across the discussions, resulting in user activity tags 26. User feedback tags 27 are also generated by the statistics engine 5 as a relative frequency statistic of seeking or providing feedback. Statistics around the frequency of inappropriate language or divergent conversation result in negative sentiment tags 28. These are only some of many statistics that may be included in the SMC system to provide a "live" birds-eye-view and summarization of the stored conversations In the SMC system, user can tailor the viewing pane to display desired statistics as well as create new once. This feature could also be used for voting. For example, a chart may be displayed in a group with live updates capturing enthusiasm vote or rating on a particular topic/idea/proposal.

Figure 9:
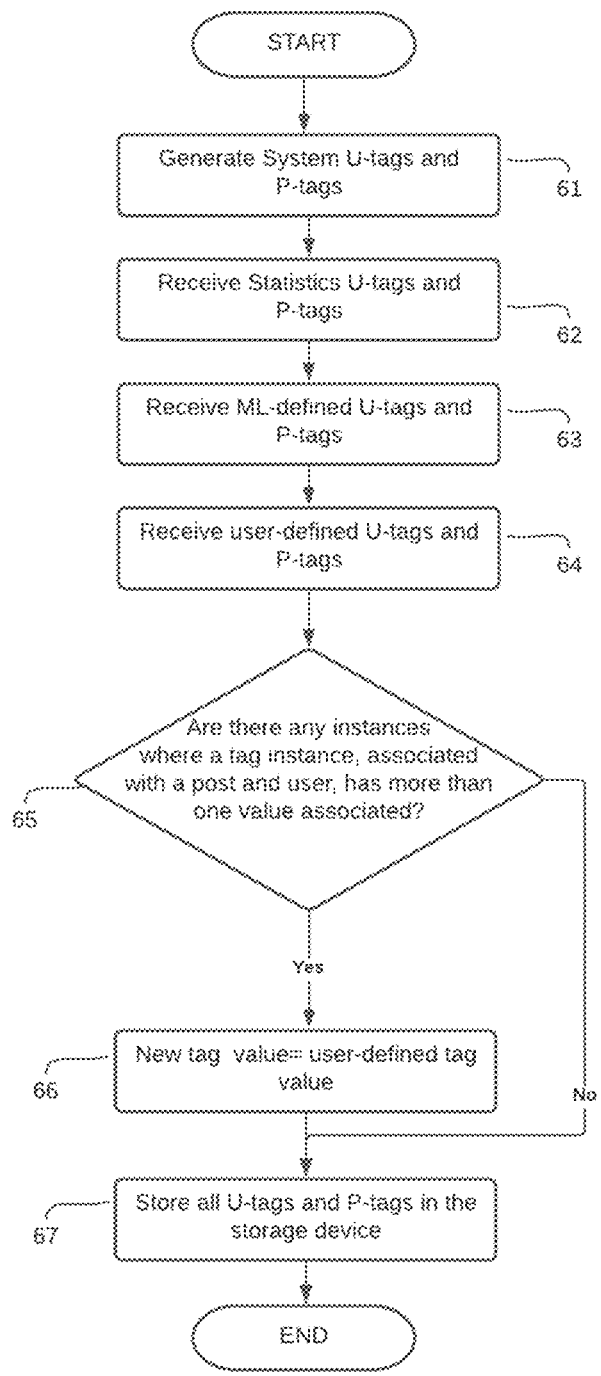
FIG. 9 show the workings of the tag management engine.

Tag management engine 8 depicted in FIG. 9 illustrates the collation of all the tags in the system. The tag management engine 8 also generates system tags in step 61, which are mainly extracted directly from the database structure. These include, but are not limited to: all parents of the post, stored message timestamps 18, time-tags 21 capturing a set of time related tags user can attach to posts, and profile tags 29 describing user's current employer, group or division, position in the organisation, expertise, date joined team or discussion etc. If the user prefers not to enter the information about the profile manually, then the Profile Analysis Engine 105 can automatically extract this information from user's CV or social media presence. The tag management engine then receives statistics tags 62, ML-defined tags 63, and user-defined tags 64. In case of a user-tag instance being assigned more than one value, the tag management engine 8 will prioritise user-defined tag value over any system or ML-defined tags values 66. Once all conflicts have been resolved, the resulting tags are stored in the database 67.

Figure 10:
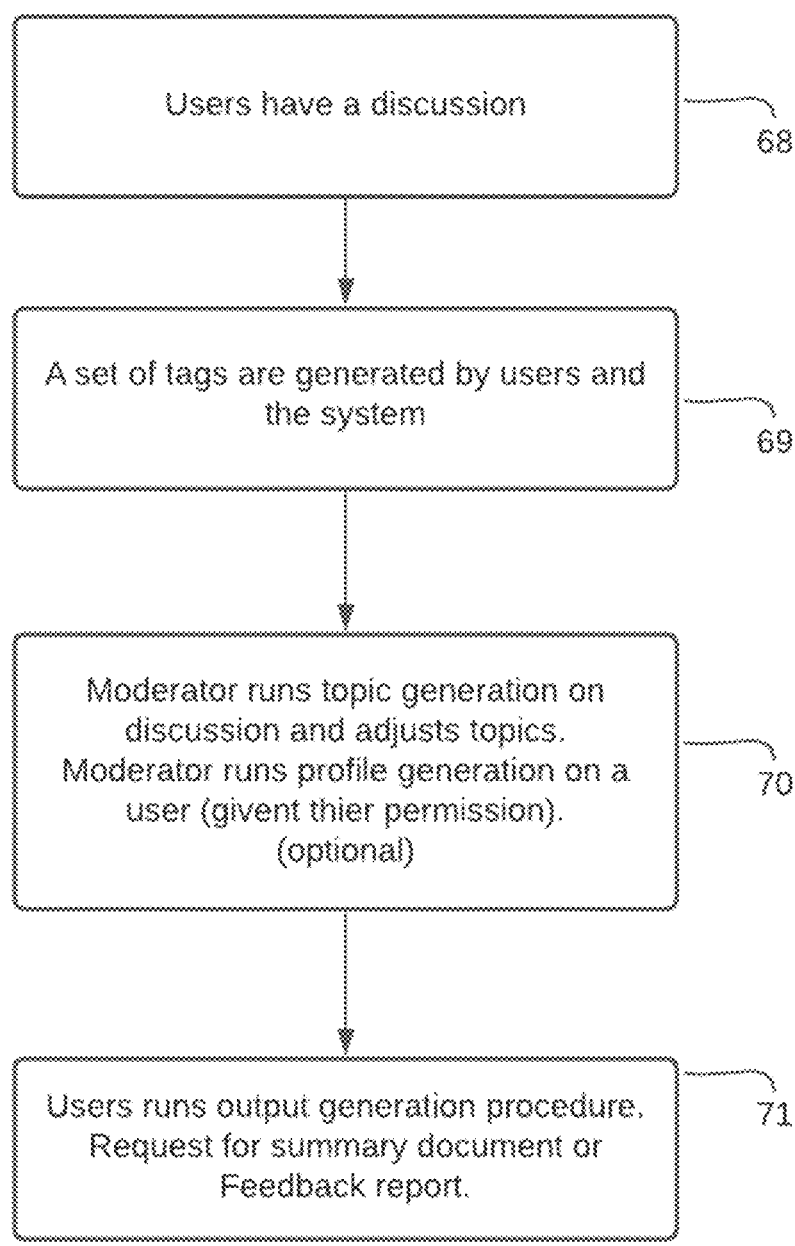
FIG. 10 shows high level timeline from discussion to summary output.

Timeline from having a discussion to generating output is illustrated in FIG. 10. On a high level, the system is seeded with user discussions 68. As the posts get submitted to the system, users have an option to associate user-defined tags with any posts or users in the system 69. Concurrently, the system will generate a set of semantic messaging system tags 69 that are predominantly drawn from the database, statistics tags generated by the statistics engine 5 and sentiment tags 28 generated by the Sentiment Analysis Engine 7 in the NLP engine 6. Upon user or moderator request with user text selection, the Topic Analysis Engine 4 generates a list of post topic tags for moderator review and subsequent post classification 70. Furthermore, a moderator can choose to invoke the Profile Analysis Engine 105 to create profile tags for a specific user of interest. In one embodiment, a user would need to grant permission for moderator to search the web for the personal information. At that stage, the system is ready for user to submit a data request, for example, for a summary or feedback report and invoke an output generating procedure 71.

Figure 11:
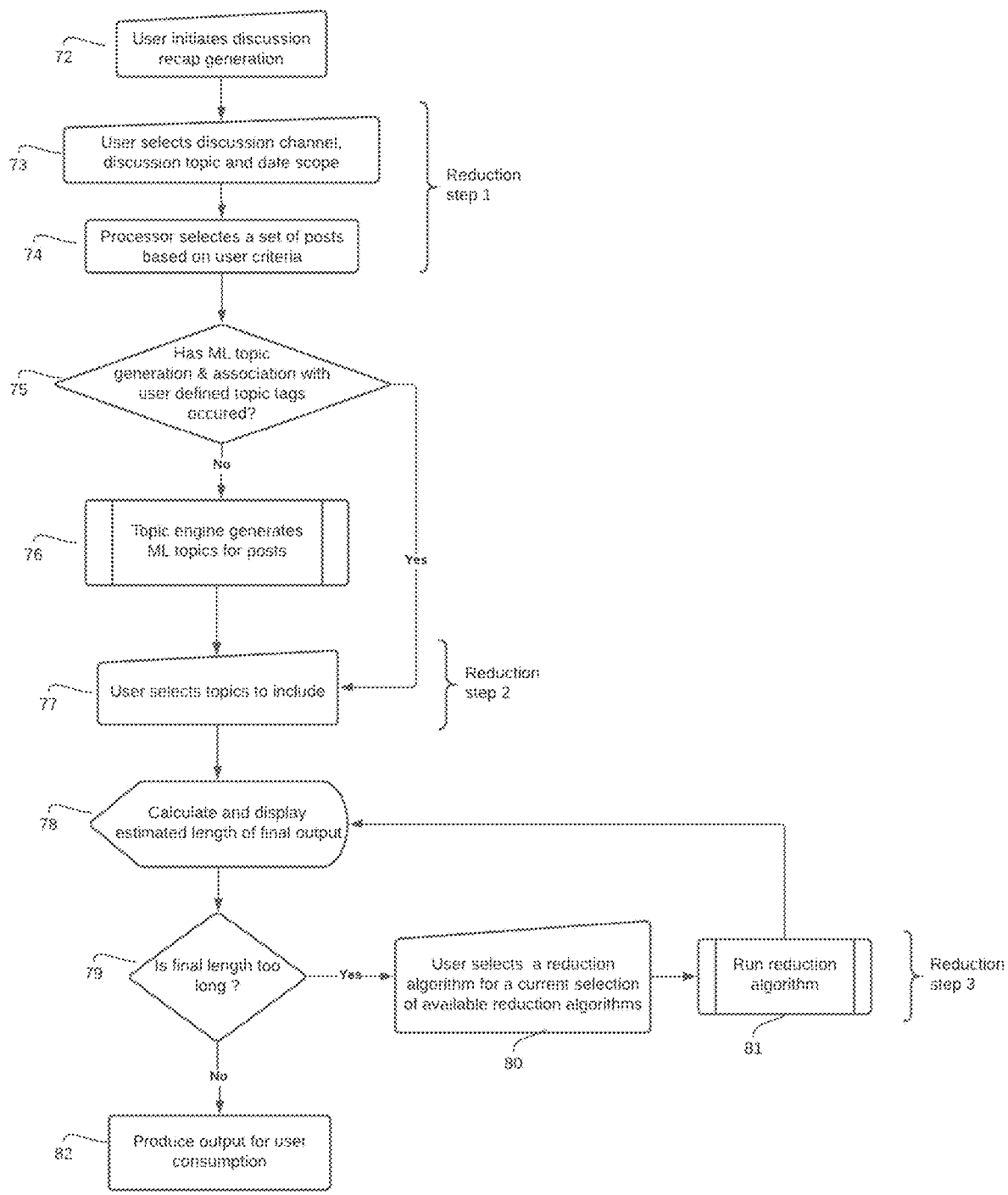
FIG. 11 is a summary or file output generation procedure.
Figure 12:
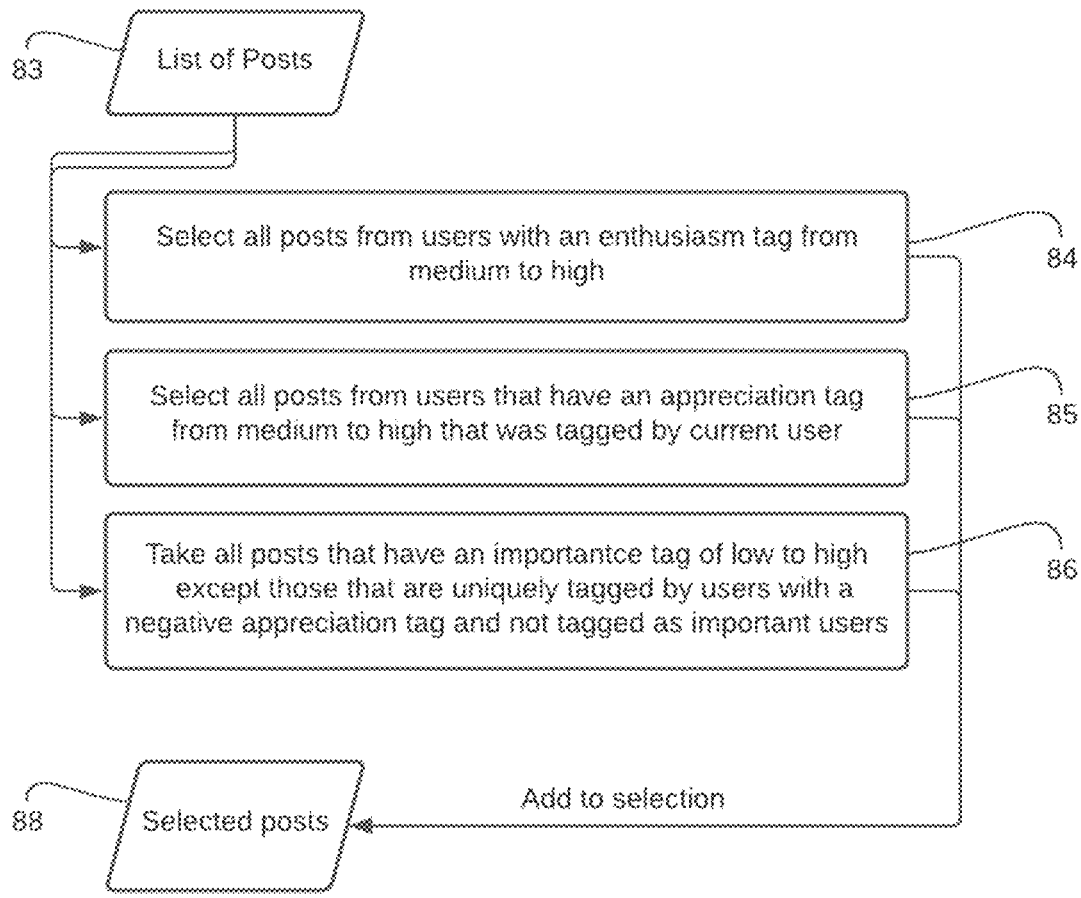
FIG. 12 is an example of Reduction 3 algorithm, from FIG. 11.

Output Generating Procedure is shown in FIG. 11. It begins with user initiating a request for a summary report or recap or meeting notes 72 or other, via the user request for data 3 through a GUI portal. The user then needs to select a channel or discussion or sub-discussion or a set of discussions or sub-discussions that he/she would like to summarize 73, along with the time frame. For example, user may request a summary report from sub-discussions X & Y, under discussion A, channel B, covering all messaging between December 2019 until January 2021. The processor would then find all the posts that fit these criteria 74. Therefore, steps 73 and 74 have now reduced the total stored posts in the system to a smaller, more manageable subset of posts. Step 75 checks if the ML-topics have been assigned to the selected collection of posts, and if not, they can be assigned in step 76 by invoking the NLP engine 6. Once ML-topic tags have been generated, the user or moderator reviews the list as described in the topic classification engine procedure of FIG. 7. At this point, user has an option to control the length of the summary report, whereby the system presents the total length of the current selection 78. If the length is deemed to be too long, the user can select one of the reduction algorithms 80. This step leverages the sophisticated tagging system for filtering and reducing the summarization content. After the reduction user reviews the updated length (presumably shorter than the last one) in step 78. If the length is satisfactory, the output is generated in 82, otherwise the reduction process repeats until requesting user is satisfied. One example of a reduction algorithm is described in FIG. 12. Here, a user is interested in seeing only posts with judgement tag 20 medium to high 84, and appreciation tag 32 from medium to high 85. A further reduction 86 could be to exclude users with negative importance tag 31 and negative appreciation tag 32. Finally, the reduced selection of posts is added in 88.

Figure 18:
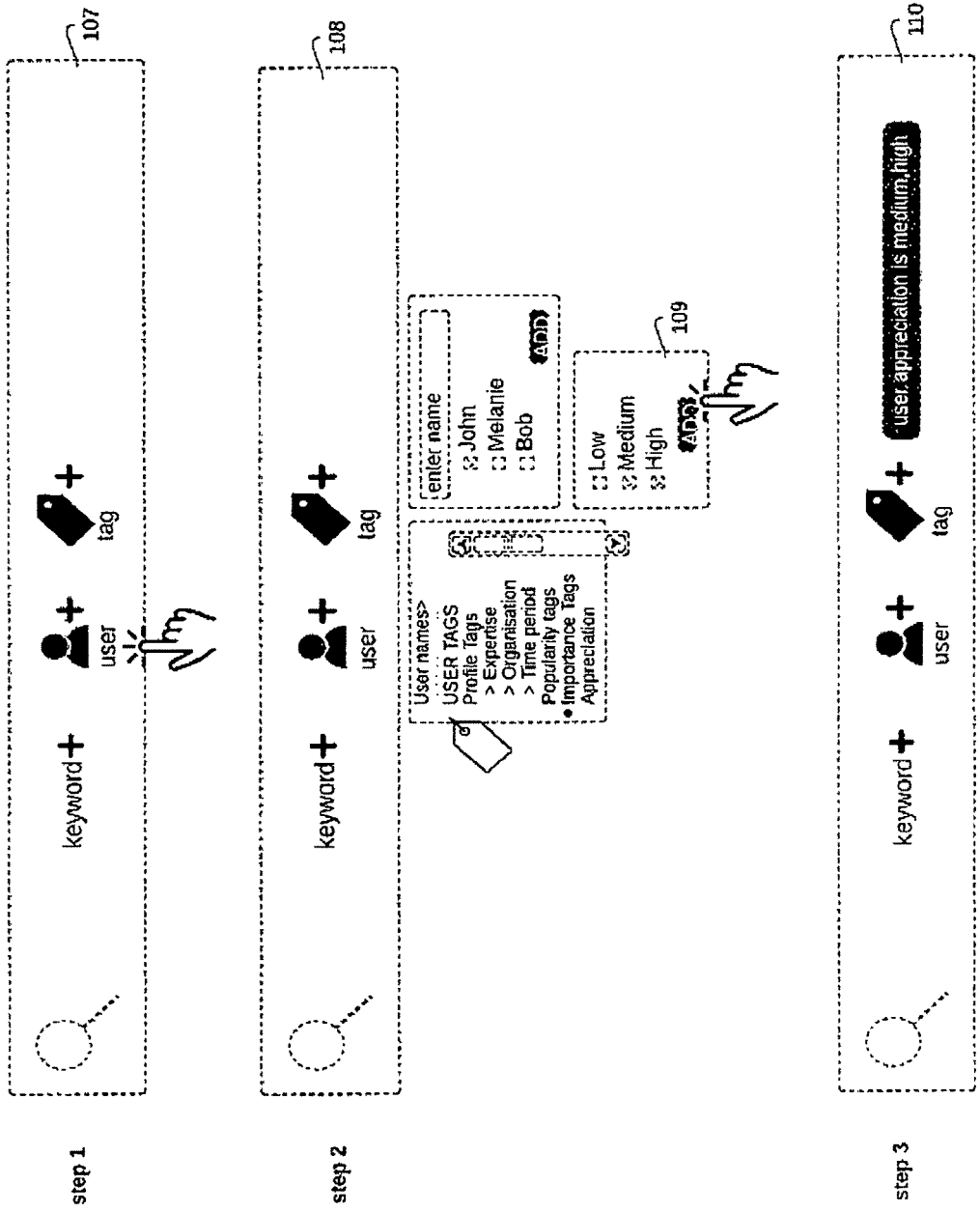
FIG. 18 is second embodiment of the filtering portal.

The filtering portal allows users to submit a query to the system, for the purpose of finding and extracting information. It leverages three types of information: keywords, users and tags (U-tags 14 or P-tags 15). Keywords are utilised in a typical way, however in the SMC system the search is enhanced by combining it with the sophisticated tagging system. A plurality of tags and keywords can be selected, adjoined with logic gates such as AND, OR, NOR, NAND. Furthermore, in queries with AND and OR statements user can attach weight to each AND statement, so long as the total percentage adds up to 100%. This way he/she can control the content distribution, such as: query X=25% <input1> OR 17% <input 2> OR 58% <input 3>. A practical example could be a user wanting to retrieve latest news feed and entertainment from the SMC system, and is interested in 25% of the content being about "cars", 17% "Sky news" and 58% "funny videos". One embodiment of the filtering portal is presented in FIG. 13 90, where a user can interface with a text-based filtering portal 89 such that as the user query starts by typing a name of the tag instance—the system either autocompletes or a drop-down menu appears 91. The query command for selecting a tag could begin by user first writing the tag type: user or post, followed by semantic class, tag instance and finally assignment of desired value. In one embodiment, the syntax could be such that these qualifiers are separated by dots. For example, in FIG. 13 user wanted to perform a search by filtering the posts based on user appreciation tag 32 being medium to high 92 and post topic tag 19 being "Patent" 94, 95. In the text based search filter he/she could write <user.appreciation>low>& <post.topic="patent"> or <user.appreciation>low>AND <post.topic="patent">. This type of text-based interface is particularly well suited to those that are familiar with code and prefer the more efficient but also more technical interface. Another, less technical embodiment of the filtering portal interface is presented in FIG. 18. Here a user is greeted with a search bar containing three icons enabling interaction with keywords, users and posts, as can be seen in 107. Should a user decide to click on icon user+, a popup menu would appear permitting either a selection of one of the other users or user tags 108. In the example shown in 108 available users are John, Melanie or Bob. However, our user is interested in filtering based on user tag values irrespective of the user. He/she is interested in seeing posts from their bosses and hence chooses an importance tag 31 containing ranking of medium to high 109. Once checking his/her selection the user clicks the ADD button 109 to add this selection to the query. The selection is now observable in the portal, as seen in 110. From here the process repeats, with user being able to select a plurality of different choices combined with logic gates. The purpose of the logic gates is to permit searches beyond just AND or intersections, by allowing users to gather a union or complement of the interacting search components. The benefit of this feature becomes clearer in the context of generating output reports in the story engine 9.

Figure 16:
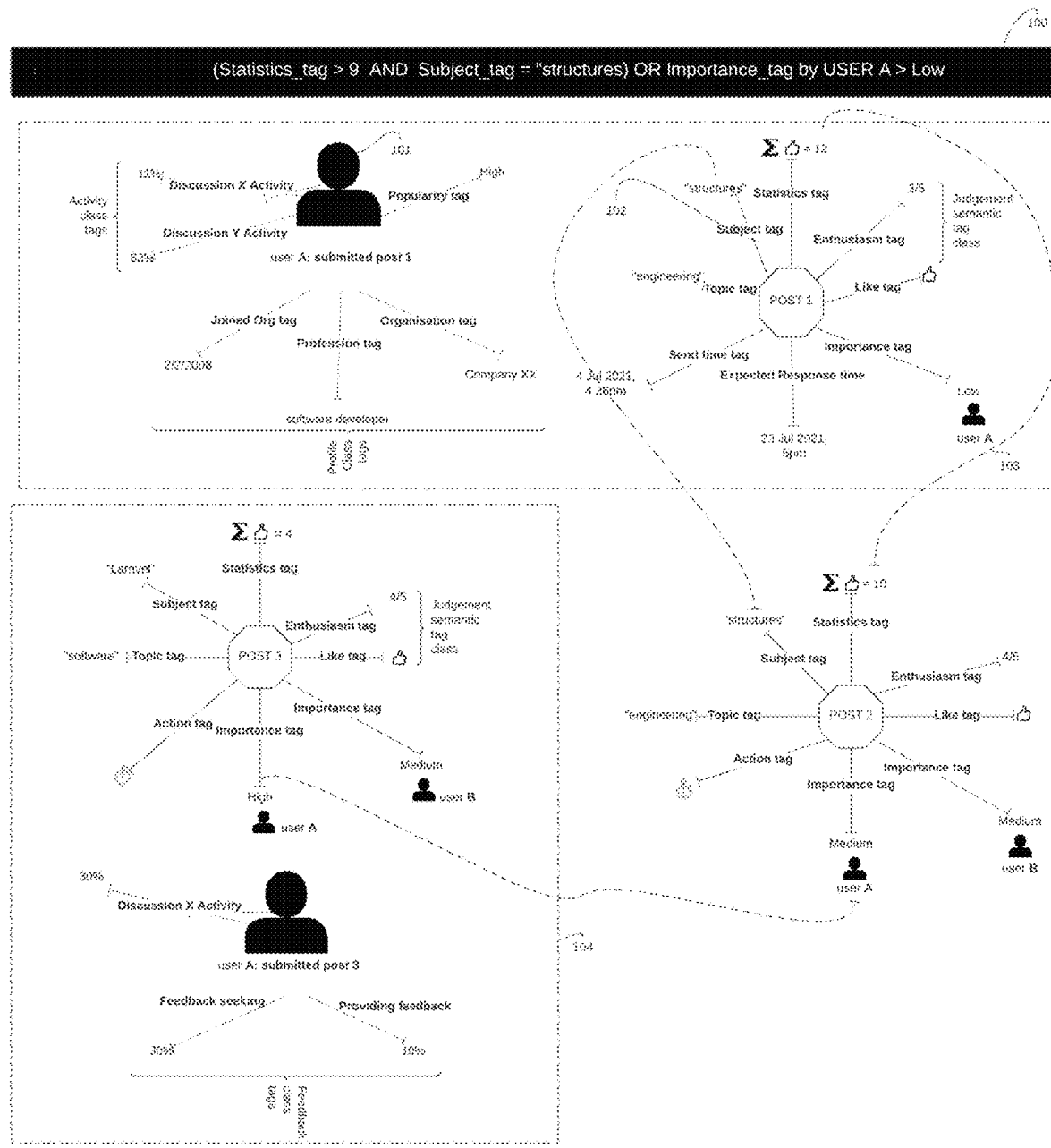
FIG. 16 shows interactions between user and post-neurons.
Figure 19:
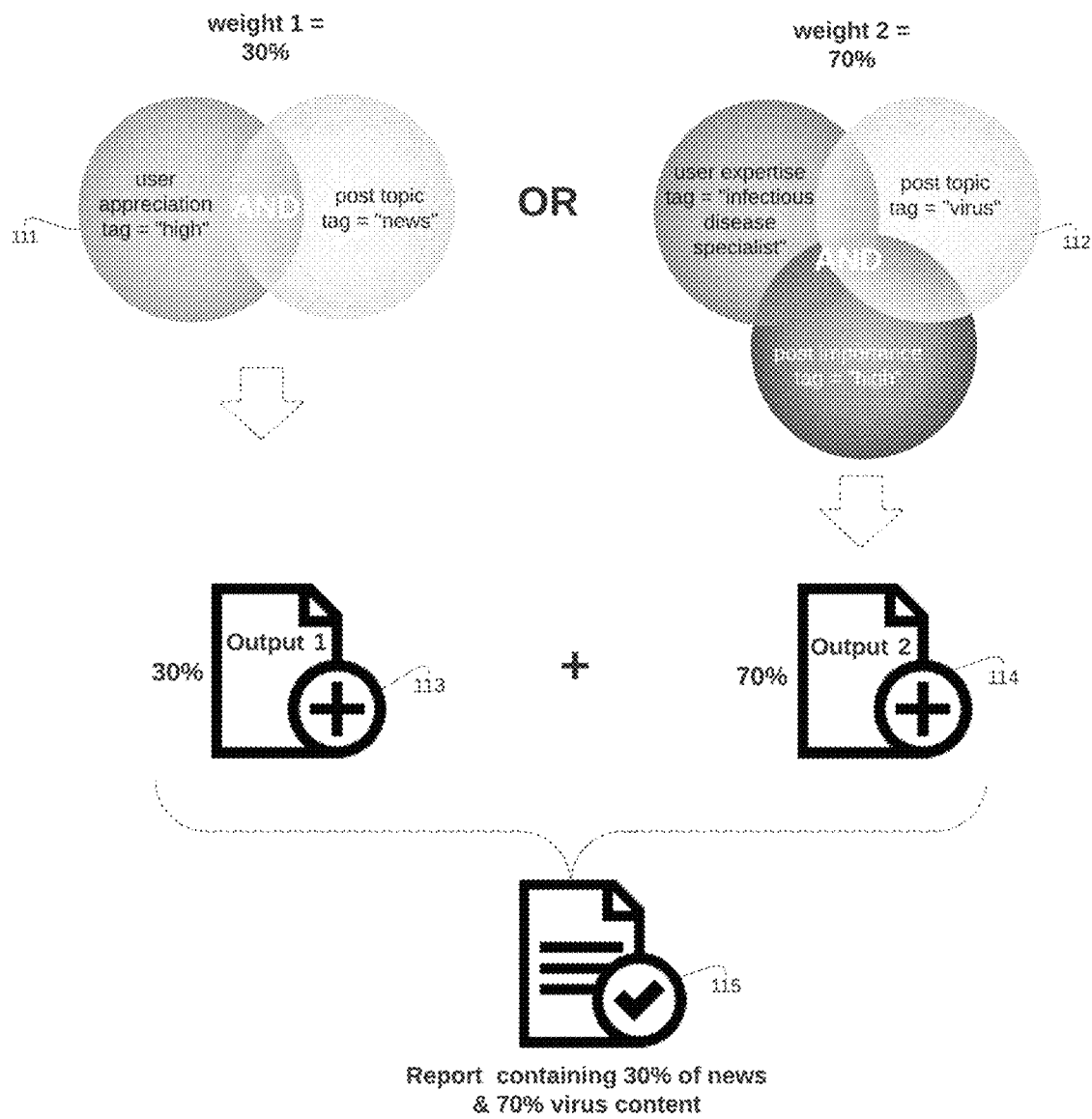
FIG. 19 is the depiction of use of logic gates for generating reports.
Figure 20:
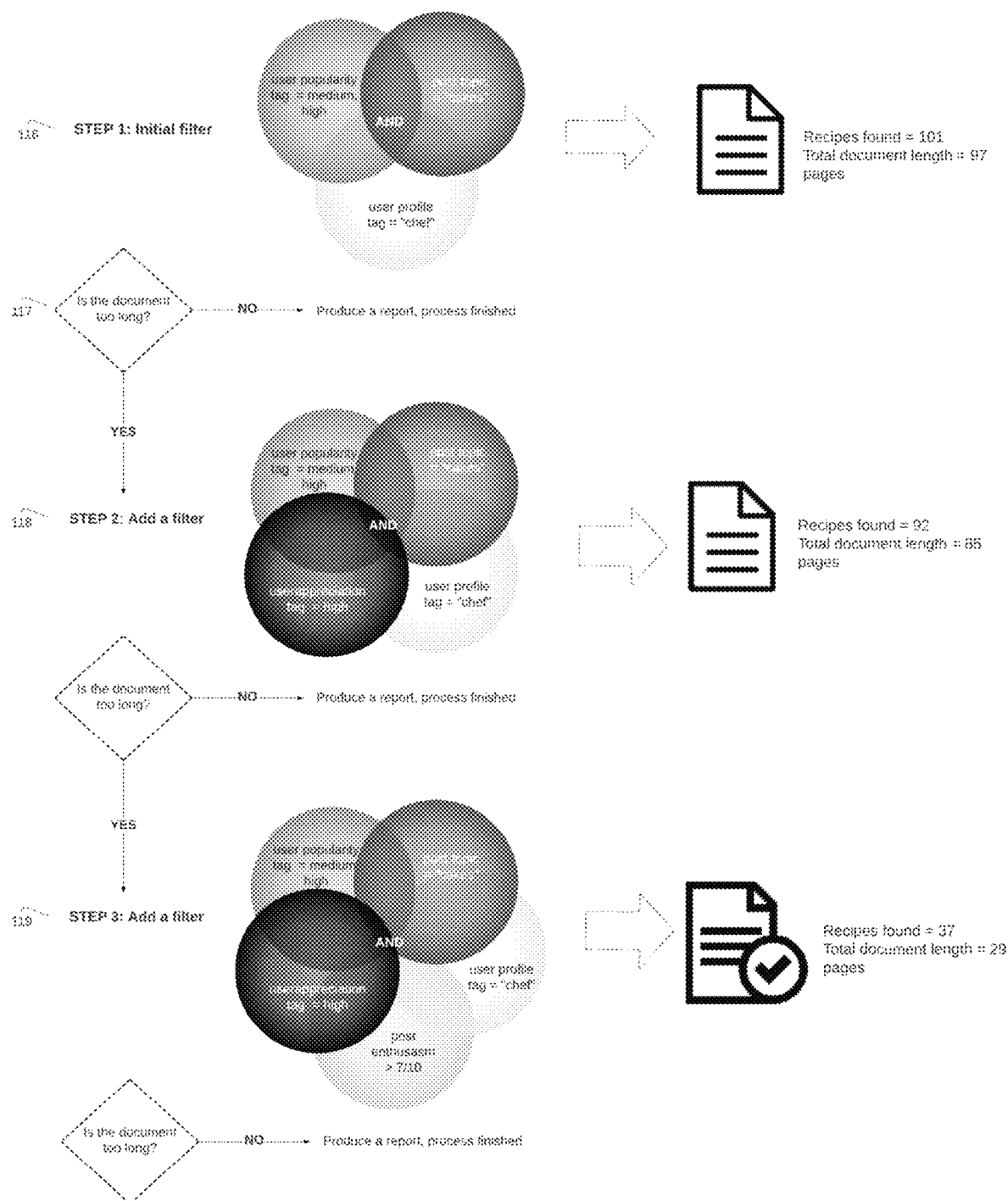
FIG. 20 feedback procedure for controlling the length of the output document.

Story engine 9 leverages the sophisticated semantic tagging system comprising U-tags 14, P-tags 15, and their interconnections, i.e. 103. This connected tagging network allows users to precisely extract desired posts 13 and connect them via story engine 9 into meaningful output files, called collages. FIG. 16 provides an example of user data request 100 and the consequent user-post, post-post connections, 103. In this example, user was interested in extracting all posts that scored more than 9 thumbs up or had subject "structures", as well as those posts that were rated "Medium" or "High" by trusted user A. Since the user wanted to see both of these selections at the same time, he/she would have selected logic gate OR. As a result, in this simple example, the requesting user will see {Post 1, Post2 and Post 3}. However, if the same user wanted to see all posts that scored more than 9 thumbs up AND had subject "structures", he/she would only see {Post1 and Post 2}. Alternatively, if the user chose to see all posts that scored more than 9 thumbs up AND had subject "structures" AND those posts that were rated "Medium" or "High" by trusted user A, they would see an empty set of posts { }. FIG. 19 shows the Venn diagrams illustrating the action and interaction of logic gates when it comes to generating an output report, in this example a summary of the "Laravel" project. The selection criteria for this report is to extract all posts that relate to topic "news" from the highly appreciated and trusted users 111, combined with all posts on topic "virus" that have been ranked as highly important AND contributed by users who are infections disease specialists 112. Furthermore, this report has an additional requirement for the content to be distributed such that 30% is dedicated to news and 70% to virus posts. The distribution of content is controlled by allocation of weights, where weight can be associated with each AND statement. The result of the former AND statement will result in a set of posts 113, whilst the latter AND statement will generate a set of posts 114. The two sets of posts 113 and 114 are then distributed in the output report 115, as 30:70 ratio respectively.

What is claimed is:

1. A computer implemented messaging system for organizing and extracting information from messages sent between users of the messaging system, comprising:
   a plurality of storage devices;
   a network interface in signal communication with the plurality of storage devices configured to receive and store posts from the users of the messaging system and data related to the users of the messaging system, wherein a post is a message that comprises at least one of text, speech, graphics, and video, and configured to receive and store user-post-interaction data, wherein the user-post-interaction data relates to information associating users with other users or with other users' posts; and,
   one or more processors configured to access the posts from the users of the messaging system, the data related to the users of the messaging system, and the user-post-interaction data,
   wherein the one or more processors are configured to generate a set of P-tags and a set of U-tags from the posts from the users of the messaging system, from the data related to the users of the messaging system, and from the user-post-interaction data,
   wherein a P-tag is a tag associated with a post and a U-tag is a tag associated with a user,
   wherein the set of P-tags and the set of U-tags each have associated therewith a plurality of semantic classes,
   wherein a semantic class is logical grouping of tags,
   wherein each P-tag of the set of P-tags has a P-tag value associated therewith and each U-tag of the set of U-tags has a U-tag value associated therewith,
   wherein some of the P-tag values and/or some of the U-tag values correspond to, or are derived from, users' inputs, and wherein some of the P-tag values and/or some of the U-tag values are generated by a machine learning natural language processing engine and a statistics engine and a tag management engine, and
   wherein the one or more processors, in dependence upon keywords and values of P-tags and values of U-tags, are configured to filter and extract information based on a query.

2. A system as defined in claim 1, wherein the one or more processors are configured to combine the information based on the query into collages in response to the query.

3. A system as defined in claim 1, wherein the machine learning natural language processing engine is configured to analyze and determine a user's expertise and to associate a determined expertise with a U-tag.

4. A system as defined in claim 1, wherein the machine learning natural language processing engine is configured to determine a pest sentiment from each of a plurality of posts and to apply P-tags from the determined sentiments; and/or wherein the statistics engine is configured to calculate statistics stored as U-tags in dependence upon P-tags related to a particular user, for providing feedback to the particular user.

5. A system as defined in claim 4, wherein the one or more processors are configured to send or receive a message with a predetermined delay, or to send or receive a message with a delay dependent upon an occurrence of a particular event.

6. A system as defined in claim 5, wherein the one or more processors are configured to process a user query, wherein a portion of the user query is related to a topic and wherein another portion is combined, using logic gates, with other inputs that are unrelated to the topic, wherein the other inputs include users and tags.

7. A system as defined in claim 6, wherein the one or more processors are configured to generate a report with content related to weights, wherein the weights are provided, by a user, to different portions of a query.

8. A system as defined in claim 7, wherein the one or more processors are configured to provide an interface having a plurality of iconized fields for selecting a user and a tag, and having a text search field interconnected with selectable logic gates.

9. A system as defined in claim 8, wherein the one or more processors are configured to combine the extracted information into at least one of the following collages: a summary report, a meeting agenda, and a feedback report, wherein the summary report includes a collage of extracted information that summarizes a select discussion or sub-discussion, wherein the collage of extracted information is based on post topic tags and user expertise tags, or is based on post importance tags and user appreciation tags, or is based on post judgement tags, statistics tags, and user action tags, wherein a meeting agenda is a collage of extracted information based on at least post action tags and user activity tags, and wherein a user feedback report is a collage of extracted information dependent on a user and at least sentiment tags and statistics tags.

10. A method of organizing and extracting information from messages, comprising:

receiving and storing posts from users of a messaging system and data related to the users of the messaging system, wherein a post is a message that comprises at least one of text, speech, graphics, and video;

receiving and storing user-post-interaction data, wherein the user-post-interaction data relates to information associating users with other users or with other users' posts;

utilizing one or more processors to process the posts from the users of the messaging system, the data related to the users of the messaging system, and the user-post-interaction data to create and attach a set of P-tags and a set of U-tags to the posts from the users of the messaging system, the data related to the users of the messaging system, and the user-post-interaction data; and assigning a P-tag value to each P-tag and assigning a U-tag value to each U-tag, wherein some of the P-tag values and/or some of the U-tag values correspond to, or are derived from, a user's input, and wherein some of the P-tag values and/or some of the U-tag values are generated by a machine learning natural language processing engine and a statistics engine and a tag management engine; and filtering and extracting information with the one or more processors in dependence upon keywords and values of P-tags and values of U-tags.

11. A method of organizing and extracting information from messages as defined in claim 10, further comprising combining the extracted information into one or more collages.

12. A method as defined in claim 10, wherein one or more P-tag values and/or one or more U-tag values correspond to a query that is based on a user's judgement.

13. A method as defined in claim 10, further comprising:

determining, utilizing a machine learning engine, an indication related to a user's reliability, credibility, or expertise; and filtering messages utilizing the indication.

14. A non-transitory computer readable medium comprising program instructions stored thereon which, when executed, cause a computer system having one or more processors and one or more storage devices to:

receive and store posts from users of a messaging system and data related to the users of the messaging system, wherein a post is a message that comprises at least one of text, speech, graphics, and video;

receive and store user-post-interaction data, wherein the user-post-interaction data relates to information associating users with other users or with other users' posts;

access the posts from the users of the messaging system, the data related to the users of the messaging system, and the user-post-interaction data;

generate a set of P-tags and a set of U-tags from the posts from the users of the messaging system, from the data related to the users of the messaging system, and from the user-post-interaction data, wherein a P-tag is a tag associated with a post and a U-tag is a tag associated with a user, wherein the set of P-tags and the set of U-tags each have associated therewith a plurality of semantic classes, wherein a semantic class is logical grouping of tags;

generate values using a machine learning natural language processing engine, a statistics engine and a tag management engine;

receive values from users;

associate a plurality of the generated and received values with a plurality of P-tags and U-tags; and, filter and extract information based on a query, in dependence upon keywords and values associated with P-tags and values associated with U-tags.

15. A Method for extracting and organizing information comprising:

receiving original information via a network from a plurality of users;

storing the original information;

using a processor to augment the original information by automatically acquiring and analyzing found information from the web, wherein the found information is based on some of the content of the original information and analyzing the original information, wherein analyzing comprises using a machine learning engine and a statistics engine to generate additional information that differs from the original information and the found information;

wherein the additional information provides connections between elements of the original information;

filtering using some of the generated additional information and using keywords related to the original information.

16. A method as defined in claim 15, wherein the filtering is also dependent upon a user's ID.

17. A method as defined in claim 15, wherein the original information contains a URL.

* * * * *